United States Patent
Barnea et al.

(10) Patent No.: US 7,042,613 B2
(45) Date of Patent: May 9, 2006

(54) BOUNCING MODE OPERATED SCANNING MICRO-MIRROR

(75) Inventors: Daniel I Barnea, Tel Aviv (IL); Slava Krylov, Holon (IL); Moshe Medina, Haifa (IL); David Schreiber, Tel-Aviv (IL); Eliezer Ben-Gad, Alon Shilat (IL)

(73) Assignee: Terraop Ltd., Kfar Saba (IL)

( * ) Notice: Subject to any disclaimer, the term of this patent is extended or adjusted under 35 U.S.C. 154(b) by 54 days.

(21) Appl. No.: 10/902,869

(22) Filed: Aug. 2, 2004

(65) Prior Publication Data

US 2005/0036196 A1 Feb. 17, 2005

Related U.S. Application Data

(60) Provisional application No. 60/550,850, filed on Mar. 8, 2004, provisional application No. 60/494,353, filed on Aug. 12, 2003, and provisional application No. 60/575,248, filed on Jun. 1, 2004.

(51) Int. Cl.
*G02B 26/00* (2006.01)
*G02B 6/42* (2006.01)

(52) U.S. Cl. .................. 359/245; 359/291; 359/290; 359/223

(58) Field of Classification Search ............... 359/245, 359/290, 291, 223, 224, 292; 385/18
See application file for complete search history.

(56) References Cited

PUBLICATIONS

"Design and fabrication of scanning mirror for laser display" H. Lee et al, *Sensors and Actuators A–Physical* 96 (2–3) pp. 223–230, 2002.

"Tuning the dynamic behavior of parametric resonance in a micromechanical oscillator" W Zhang et al, *Applied Physics Letters* 82(1) pp. 130–132, 2003.

" Optical Characterization of High Speed Scanning Micromirrors with Vertical Combdrives" H. Wada et al, *Jpn. J. Appl. Phys.* 41 (10B) pp. 1169–1171, 2002.

"A reasonatly excited 2D–micro–scanning–mirror with large deflection" H Schenk et al, *Sensors and Actuators A–Physical* 89(1–2) pp. 104–111, 2001.

"Design and Analysis of a micro–scanning mirror" I. Bucher, in *Proc. of 29$^{th}$ Israel Conference on Mechanical Engineering*, May 12–13, 2003, Technion, Haifa, Israel.

"Bouncing mode electro–statically actuated scanning micro–mirror for video applications" by V. Krylov and D.I. Barnea, submitted for publication in *Smart Materials and Structures, Mar. 2004*.

"Overview of Light Beam Scanning Technology for Automotive Projection Displays" Lippert et al Microvision Inc, www.mvis.com.

*Primary Examiner*—Timothy Thompson
(74) *Attorney, Agent, or Firm*—Mark M. Friedman

(57) ABSTRACT

A MEMS apparatus for scanning an optical beam comprises a mirror operative to perform a rotational motion to a maximum rotation angle around a mirror rotation axis, and a bouncing mechanism operative to provide a bouncing event and to reverse the rotational motion. The bouncing event provides the mirror with a piecewise linear response to actuation by intrinsically nonlinear electrostatic forces. The bouncing mechanism includes an element chosen to impart an overall nonlinear stiffness to the system and is selected from the group of elements consisting of a bouncer and a pre-curved nonlinear stiffness element.

42 Claims, 37 Drawing Sheets

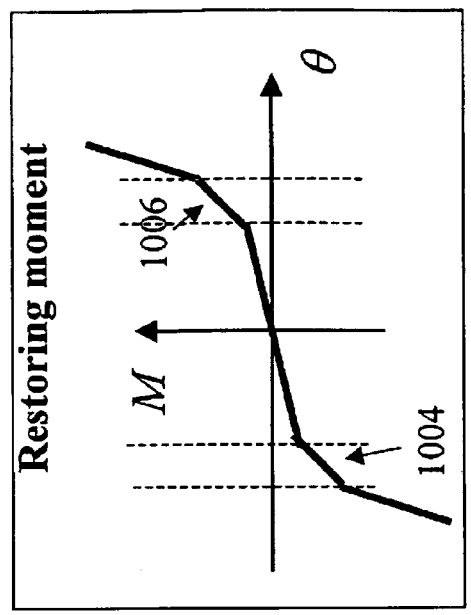
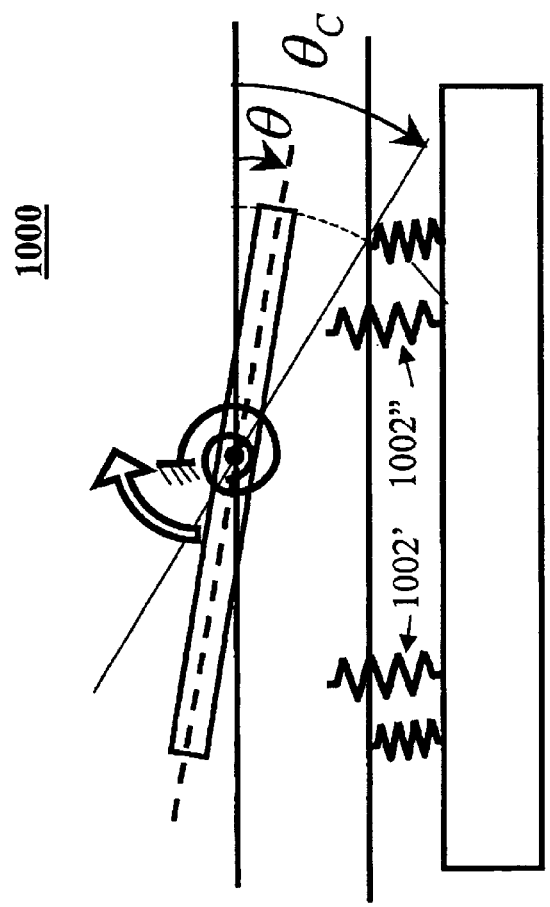
FIG. 10

SECTION A-A

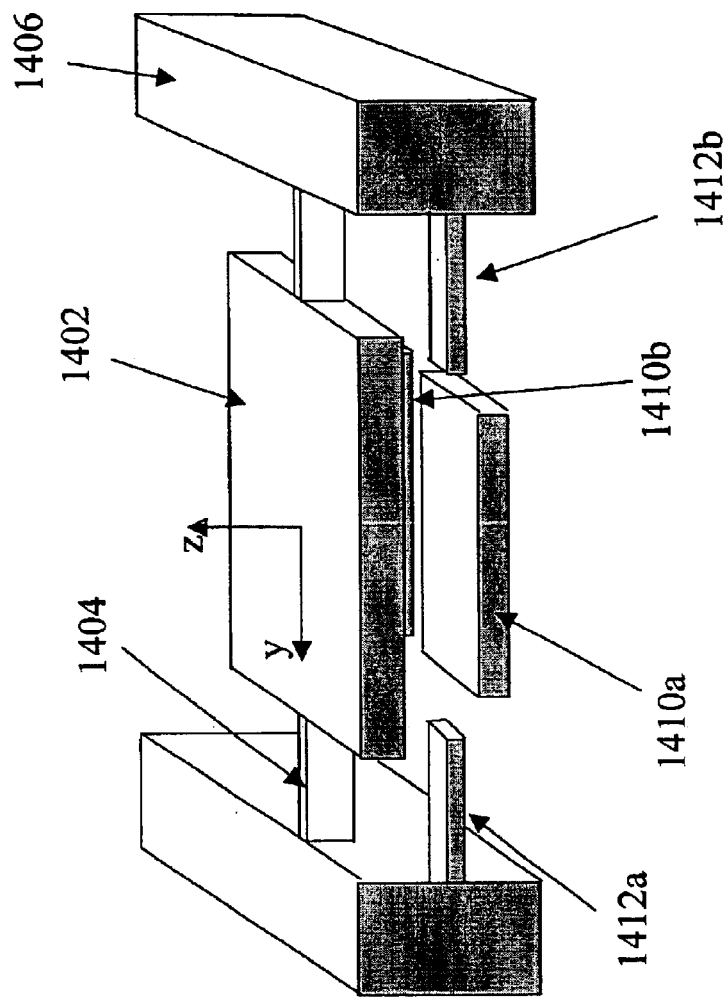
SECTION A-A    FIG. 14b

SECTION A-A

SECTION A-A

BOUNCING MODE OPERATED SCANNING MICRO-MIRROR

CROSS REFERENCE TO RELATED APPLICATIONS

The present invention claims priority from U.S. Provisional Patent Applications Nos. 60/494,353 filed 12 Aug., 2003, 60/550,850 filed 8 Mar. 2004, and 60/575,248 filed Jun. 01, 2004, the contents of which are incorporated herein by reference.

FIELD OF THE INVENTION

The present invention relates generally to scanning micro-mirrors implemented in Micro Electro Mechanical Systems (MEMS) or Micro Opto Electro Mechanical Systems (MOEMS), and more particularly to tilting micro-mirrors used for scanning.

BACKGROUND OF THE INVENTION

A tilting micro-mirror is a central element in many MEMS or MOEMS devices. When used for scanning, its elements and operation principle are shown in FIG. 1. A tilting micro-mirror (or simply "mirror") 100 comprises a generally flat plate (e.g. made of silicon) that has a reflecting surface 104. Plate 102 is held suspended by two torsional hinges 106' and 106" aligned along a common torsion (and tilt) axis 108. The two hinges render mirror 100 operative to tilt clockwise and counterclockwise around axis 108 in a given range of angles (typically ±5 degrees). A laser beam 110 that impinges on the reflecting surface of the mirror is redirected by the mirror to a scanned area 112. The tilting mirror is actuated by an actuation moment 120 that can be provided by well-known MEMS actuation systems.

FIG. 2 shows the required time dependence of the rotational (or "tilt") angle of a scanning mirror, i.e. the required shapes of a scanning path 202 to be followed by the reflected laser beam on scanned area 112. A triangular signal is needed for the forward-backward scanning, as shown in box 206, while a sawtooth signal 208 is needed for one directional scanning, as shown in box 210. 1>2>3>4>5>6 represent scans in the time domain. In this kind of applications, the necessity to create an image free of spatial and temporal distortions imposes specific requirements on the scanning micro-mirror motion. These include long term frequency stability and constant angular velocity (for small rotations), see J. H. Lee et al, *Sensors and Actuators A-Physical* 96 (2–3) pp. 223–230, 2002. A mirror of this type has been implemented recently in a virtual retinal display, see T. M. Lippert et al, *"Overview of Light Beam Scanning Technology for Automotive Projection Displays"*, available at Microvision Inc.®, http://www.mvis.com/pdfs/sid_auto.pdf.

Tilt mirrors are also used in optical switches and variable optical attenuators implemented in communication systems, and in light processing devices used in projection technology. A large variety of designs and operational modes have been reported, depending on the requirements imposed by the specific application. For example, in optical communication applications, the requirements of long term positioning accuracy combined with high optical quality and low thermal sensitivity are the most challenging. In contrast, micro-mirrors used in projection devices for the digital processing of visible light must fulfill requirements of high reflectivity, short switching time and high reliability, while positioning issues are usually less crucial.

While linear motions are highly desirable in all micro-mirrors, it is difficult to provide it. The difficulty is mainly the consequence of the intrinsic nonlinearity and high level of uncertainty of operational forces developed by MEMS actuators. A large variety of micro-device actuation principles and methods are known. These include electrostatic, magnetic, thermal, piezo, laser and flow-induced actuation, as well as actuation based on shape memory alloys. Electrostatic actuation and magnetic actuation remain the most widely used methods. The main advantage of magnetic actuation is the linear relationship between the input signal (electric current) and the actuation force. However, the price paid is usually a high power consumption resulting in high heat generation, intricacy of the design and relatively complicated fabrication processes. In addition, the scaling laws of magnetic actuators are less favorable that those of electrostatic actuators.

The required typical size of a micro-mirror for scanning application in a retinal display (from hundreds of microns up to a millimeter) and the required operation frequencies (tens of KHz) make electrostatic actuation attractive for this use. In addition, advantages of electrostatic actuation include simple, well-established processes used for the fabrication of electrostatic devices, low power consumption, and developed modeling tools and large variety of design concepts reported in literature. However, the central difficulty of electrostatic actuation is the intrinsic nonlinearity of electrostatic forces. In the case of a scanning mirror, this results in a nonlinear dependence of the actuating torsion moment on the tilting angle and a nonlinear (quadratic) dependence on operational voltage. Moreover, the nonlinearity of electrostatic forces combined with the linearity of elastic restoring mechanical forces lead also to pull-in instability, which limits the operational range of the device.

To overcome these difficulties, different solutions were proposed in prior art. Specifically, a generated square root (of voltage) input signal was used by W Zhang et al, *Applied Physics Letters* 82 (1) pp. 130–132, 2003, for the operation of a micro-resonator near the parametric resonance. The use of a vertical comb drive permits the elimination of the actuation moment dependence on the tilting angle and the reduction or even elimination of the square dependence on voltage, see e.g. J H Lee et al, *Sensors and Actuators A-Physical* 96 (2–3) pp. 223–230, 2002, H. Wada et al, *Jpn. J. Appl. Phys.* 41 (10B) pp. 1169–1171, 2002, and H Schenk et al, *Sensors and Actuators A-Physical* 89 (1–2) pp. 104–111, 2001. The necessity to provide a triangular signal which is required for video applications leads to very high actuation voltages or, in the case of magnetic actuation, very large currents. This difficulty is not related to the linearity of the motion and it is a result of high angular accelerations during the inversion of the velocity. To overcome this difficulty, frequency, I. Bucher, in *Proc. of 29$^{th}$ Israel Conference on Mechanical Engineering*, May 12–13, 2003, Technion, Haifa, Israel, suggested to represent the required triangular response as a Fourier series of sinusoidal components, and to excite each of these components at the resonance The problems with tall such solutions include high complexity, difficulty to provide resonant frequencies with high accuracy, and consequently high sensitivity to fabrication tolerances and extreme difficulty in tuning the resonant frequency.

There is therefore a widely recognized need for, and it would be highly advantageous to have a scanning micro-mirror that has optimized motion linearity combined with high operational frequency and low actuation voltages.

SUMMARY OF THE INVENTION

The present invention discloses a tilting "bouncing mode" micro-mirror that uses either an additional stiffness element (also referred to throughout this description as "bouncer") or a pre-curved nonlinear stiffness element to achieve a superior scanning performance. The present invention further discloses a micro-mechanical actuator used to move a member carrying a payload (e.g. a mirror) along an axis in a periodical nonlinear angular trajectory. The present invention further discloses a novel tilting micro-mirror mode of operation that permits the achievement of a piecewise linear response of a micro-mirror device operated by intrinsically nonlinear forces. In one embodiment, the "bouncing mode" of operation according to the present invention includes a contact event between the mirror and an elastic constraint, which takes place each time the mirror reaches a prescribed rotation angle. This contact event is followed by the bouncing of the mirror and by the inversion of the angular motion, hence the name "bouncing mode". In another embodiment, the "bouncing mode" is achieved by the action of pre-curved nonlinear stiffness elements coupled at one end to an actuator and at another end to the mirror. Illustrative examples of bouncing-mode scanning micro-mirrors actuated electrostatically by both parallel-plate electrodes and planar or vertical comb drives are presented in detail. It is shown that in all embodiments, the response frequency can be tuned through the control of the actuation voltage. This feature allows to compensate for uncertainties in the parameters of micro-fabricated devices and to synchronize the response frequency with a precision sufficient for video applications. The resonant-mode operation and the application of actuation forces during the contact event, when the mirror is close to the electrode (in the bouncer plus parallel plate actuation example), enable operation at extremely low power and voltages and provide a compact and low cost actuator. Additional improvements in linearity may be achieved through the application of a correction voltage during the mirror motion between bouncing events.

In essence, the present invention uses a bouncer or a nonlinear stiffness element in a similar manner to a nonlinear oscillator, specifically to an impact oscillator, for the shaping of an output signal. While impact oscillators incorporating bouncing are known and intensively studied in the nonlinear dynamics literature, the use of a bouncer or a pre-curved nonlinear stiffness element as disclosed herein and for the purposes set forth herein is unknown.

Advantageously, in the bouncing mode using bouncers disclosed herein, the actuation forces can be applied either to the mirror (passive barrier) or directly to the bouncer (active barrier). Note that in many MEMS applications, a typical situation exists in which the structure of the micro-device is linear mechanically, and nonlinearity arises only due to actuation forces. For example, in the case of a scanning mirror the stiffness of the torsion axis is constant. As a result, the motion of the mirror in the absence of actuation forces during the time interval between bouncing events is actually a free motion of a linear system. The angular velocity of such a motion depends on the initial conditions defining the initial kinetic and potential energy of the system and on the stiffness of the torsion spring. In the case when the kinetic energy is the dominant part of the total energy of the system, the variation of the velocity during the free motion is minor and a desirable level of the linearity of motion is achievable. This situation is realizable when the stiffness of the torsion spring is small compared with the stiffness of the barrier.

Other important advantages of the devices and methods disclosed herein include low sensitivity of the frequency and shape of the output signal to the system parameters, and good controllability of frequency. These advantages arise from the fact that the frequency of the mirror is defined by the deformation of the barrier, which for its part depends on the level of the energy supplied during each bouncing event. Viscous losses during the free motion, as well as uncertainties in the system parameters, can be easily compensated by controlling this energy supplement through the actuation voltage. Note that the uncertainty in the resonance frequency of the mirror can be critical, as mentioned in H. Wada et al. above, who reported a discrepancy of 25–30% between calculated and measured values. This ability to tune the natural frequency using the actuation voltage permits long-term stabilization of the response frequency and precise synchronization of the mirror motion with a video input.

According to the present invention there is provided a tilting micro-mirror device comprising a substrate, a micro-mirror operative to perform a tilt motion around a tilt axis positioned substantially parallel to the substrate, the tilt motion defined by a tilt angle range ending in a positive or negative maximum tilt angle, and at least one pair of bouncers, each bouncer positioned on opposite sides of the tilt axis and operative to couple to the micro-mirror when the mirror reaches the positive or negative maximum tilt angle, the coupling providing an a bouncing event.

According to the present invention there is provided a tilting micro-mirror device comprising a substrate, a micro-mirror operative to perform a tilt motion to a positive or negative maximum tilt angle around a tilt axis positioned substantially parallel to the substrate, and at least one pair of pre-curved nonlinear stiffness elements having each two ends, each pre-curved element connected at one of its ends to the micro-mirror and at the other of its ends to the substrate, whereby each nonlinear stiffness element is operative to impart the mirror motion an essentially piecewise linear characteristic.

According to the present invention there is provided a MEMS apparatus for scanning an optical beam comprising a mirror operative to perform a rotational motion to a maximum rotation angle around a mirror rotation axis, and a bouncing mechanism operative to provide a bouncing event and to reverse the rotational motion, whereby the bouncing event provides the mirror with a piecewise linear response to actuation by intrinsically nonlinear forces.

According to the present invention there is provided a method for scanning an optical beam using a MEMS mirror comprising the steps of providing a mirror operative to perform a rotational motion to a maximum rotation angle around a mirror rotation axis, and providing a bouncing mechanism operative to facilitate a bouncing event and to reverse the rotational motion, whereby the bouncing event provides the mirror with a piecewise linear response to actuation by intrinsically nonlinear forces.

BRIEF DESCRIPTION OF THE DRAWINGS

Reference will be made in detail to preferred embodiments of the invention, examples of which may be illustrated in the accompanying figures. The figures are intended to be illustrative, not limiting. Although the invention is generally described in the context of these preferred embodiments, it should be understood that it is not intended to limit the spirit and scope of the invention to these particular embodiments. The structure, operation, and advantages of the present preferred embodiment of the invention will become further apparent upon consideration of the following description, taken in conjunction with the accompanying figures, wherein:

FIG. 10 shows schematically yet another embodiment of a bouncing mode micro-mirror device with a pair of additional softer bouncers connected to the substrate;

FIG. 12 shows schematically a pre-curved nonlinear stiffness element that may be advantageously used in the bouncing micro-mirror devices of the present invention;

FIG. 12b illustrates the dependence between the applied force and the elongation of the nonlinear stiffness element of FIG. 12a;

DETAILED DESCRIPTION OF THE PREFERRED EMBODIMENTS

Figure 1:
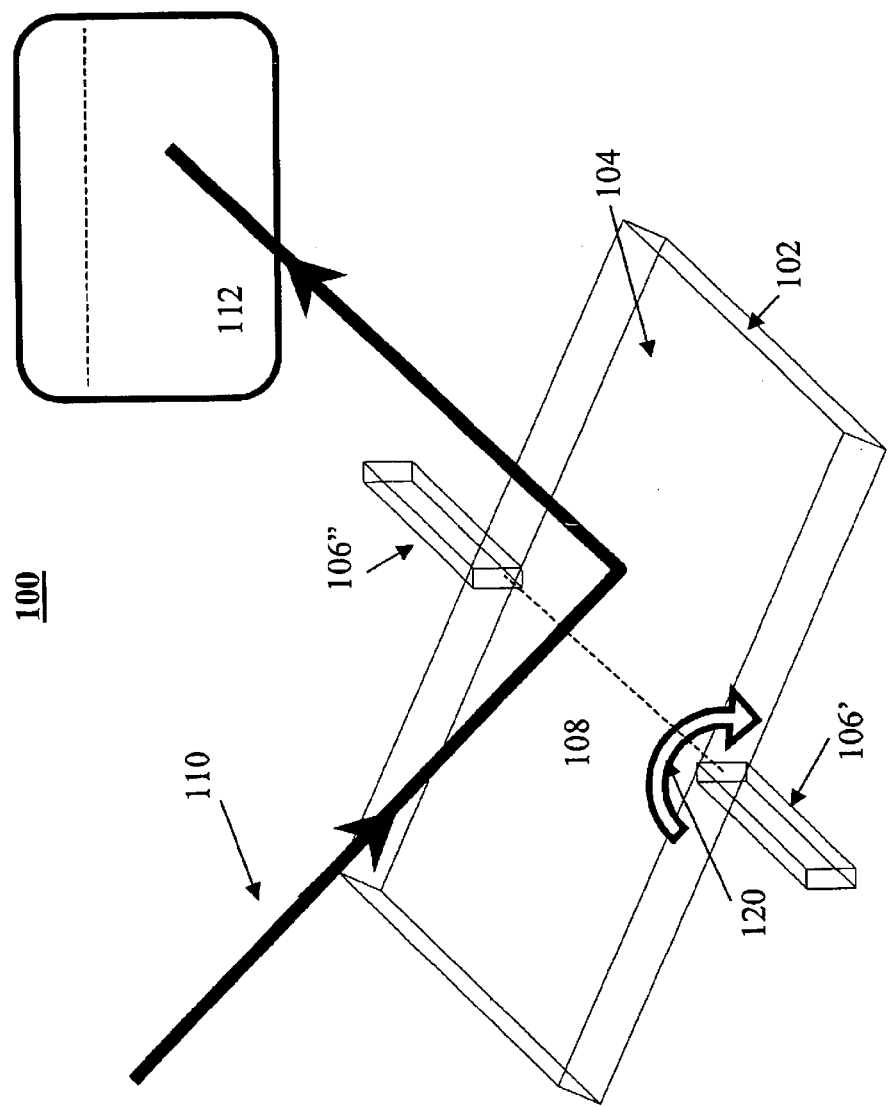
FIG. 1 shows the elements and operation principle of a tilting micro-mirror used for scanning.
Figure 2:
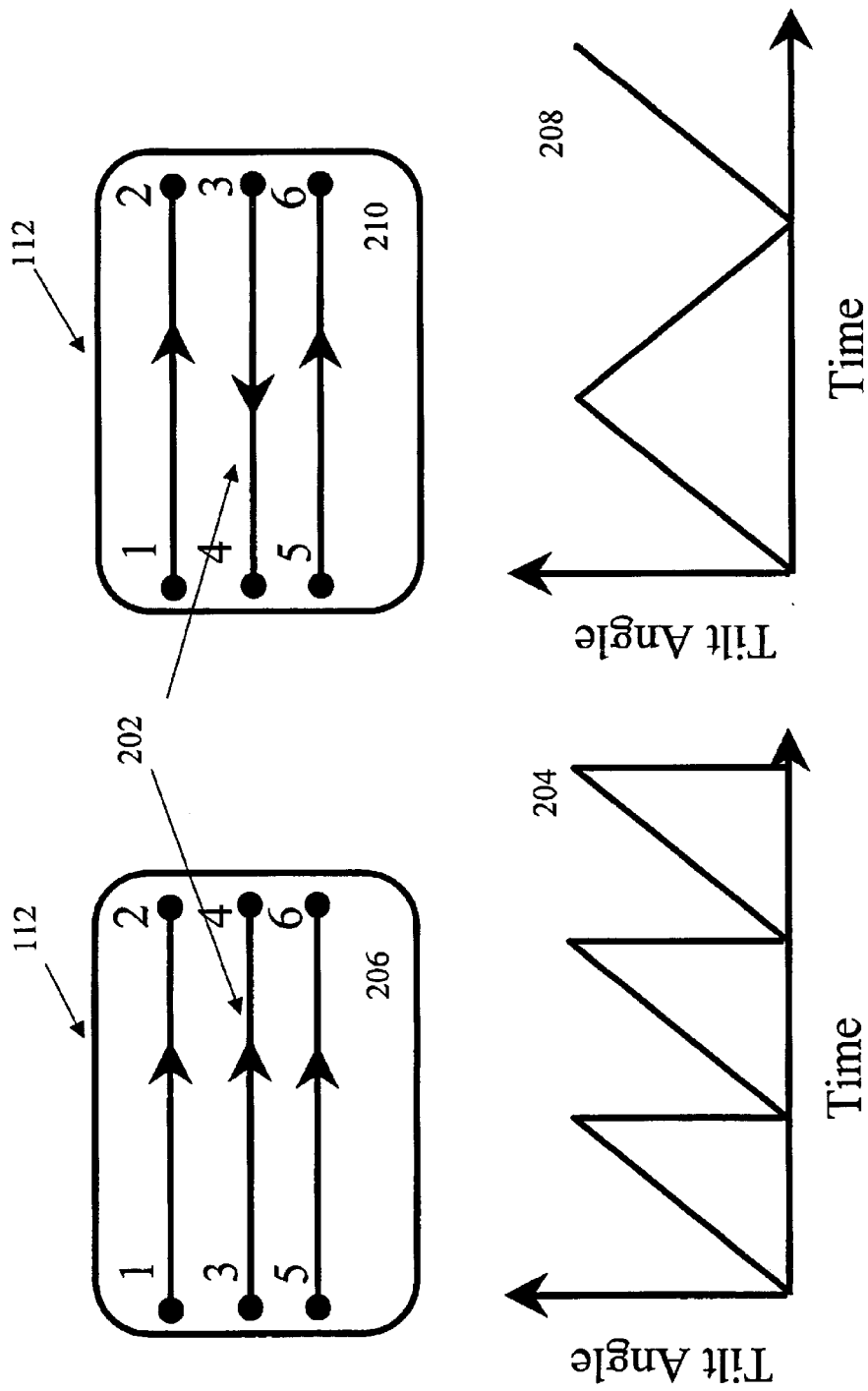
FIG. 2 shows the required time dependence of the rotational angle of a scanning mirror.

The present invention discloses a tilting bouncing mode micro-mirror that uses either an additional stiffness element ("bouncer") or a pre-curved nonlinear stiffness element to achieve a superior scanning performance. While a bouncer such as a cantilever or beam is an element with linear stiffness, we have found inventively and advantageously that its cooperative action with other elements of the system (specifically a torsion spring) that have a different stiffness yields a combined "nonlinear stiffness element" effect. The bouncing mode uses an actuation operation mode based on a special nonlinear actuation and control principle. The "bouncing-mode" actuator that actuates the mirror is operated in the self-exciting mode and its motion is actually a limit cycle. The actuator moves the mirror in a piecewise linear trajectory. The nonlinear actuation and control principle provides a set of desirable features such as small size and weight, low power and low heat dissipation, high frequency cycle with fine and accurate feedback controllability, quasi-linear trajectory intervals, low acoustical noise and more. A full description of the theory and simulations that describe the nonlinear actuation and control that provide the bouncing mode of the present invention may be found in "Bouncing mode electro-statically actuated scanning micro-mirror for video applications" by V. Krylov and D. I. Barnea, submitted for publication in *Smart Materials and Structures, March* 2004, which is incorporated by reference for all purposes set forth herein.

The invention makes use of loop-shaping methods based on the utilization of the properties of a nonlinear resonator. The method permits the shaping of an output signal to a required form (for example to a triangular or saw tooth form) from another shape of an input signal (for example sinusoidal or rectangular).

The motion of a generic nonlinear oscillator, excited for example by a sinusoidal signal, can be described by the equation:

$$\ddot{\theta} + c\dot{\theta} + \sum_k \varepsilon_k \theta^k = A\sin(\omega t) \qquad (1)$$

where $\theta, \dot{\theta}$ and $\ddot{\theta}$ are respectively the angle and its first and second time derivatives, c and A are constants, ω is the frequency, t is time, and $\varepsilon_k$ represents parameters of nonlinearity. Since the equation is nonlinear, the periodic output signal (if is exists) is not sinusoidal and contains higher harmonics:

$$\theta = \sum_k a_k \sin(k\omega t) + b_k \cos(k\omega t) \qquad (2)$$

The parameters of nonlinearity $\varepsilon_k$ can be chosen in such a way that the parameters defining the shape of the output signal, namely $a_k, b_k$ take the values resulting in the required shape of the output signal. Tuning of the resonant frequency is possible as well, due to the nonlinearity of the system. A transducer of this type has an advantage of compactness, since it is based on a single element.

The very special properties of the bouncing mode actuator enable a set of applications in electrical and optical waveshaping, where the actuator's payload forced movement (by an input signal) is transformed into a new shape (e.g. from sinusoidal to a triangular saw tooth) and frequency. Exemplary applications may include the movement of a micro-mirror so as to achieve a retinal scan-injection of a video display. The movement of the mirror facilitates a relatively simple electronic interface between standard video streams into the signaling that activates the display system. Another application may be in RF devices used, for example, for generation of various signals by a single element.

The following description uses electrostatic tilting as an exemplary actuation means. The electrostatically-tilted micro-mirror described herein fulfills the requirements of motion linearity, high operational frequency and low actuation voltages imposed by laser display applications. It is understood that the electrostatic actuation described may be replaced by other actuation methods such as thermal, magnetic, or piezoelectric actuations.

Figure 3:
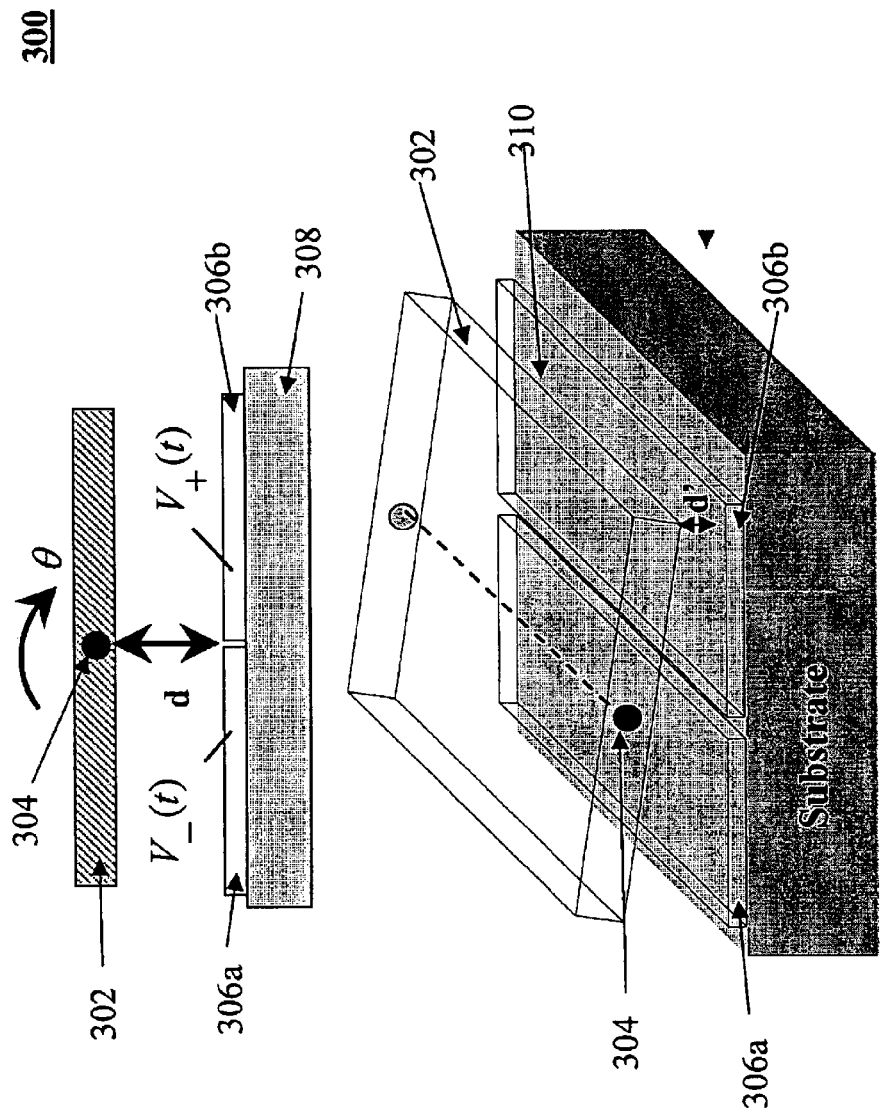
FIG. 3 illustrates schematically a prior art tilting mirror that uses parallel plate electrostatic actuators.

FIG. 3 shows schematically a prior art tilting mirror device 300 that uses parallel plate electrostatic actuators. Device 300 comprises a mirror 302 suspended by a torsion axis 304 at a distance d from two parallel plate electrodes 306a and 306b located under the mirror on a substrate 308. Due to the rotation of the mirror around axis 304, at a rotation angle close to the contact angle with the electrodes a distance d' between a mirror edge 310 and the electrode e.g. 306b) is much smaller that the initial distance d. The incorporation of at least one pair of additional stiffness elements (bouncers) in the form of cantilevers, double edge clamped beams, etc. into this device is shown in FIG. 14.

Figure 20:
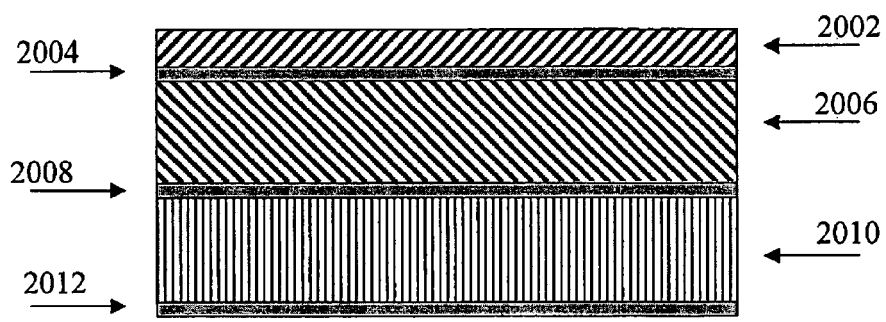
FIG. 20 shows in cross section various layers of a double-active-layer silicon-on-insulator (SOI) wafer.
Figure 21:
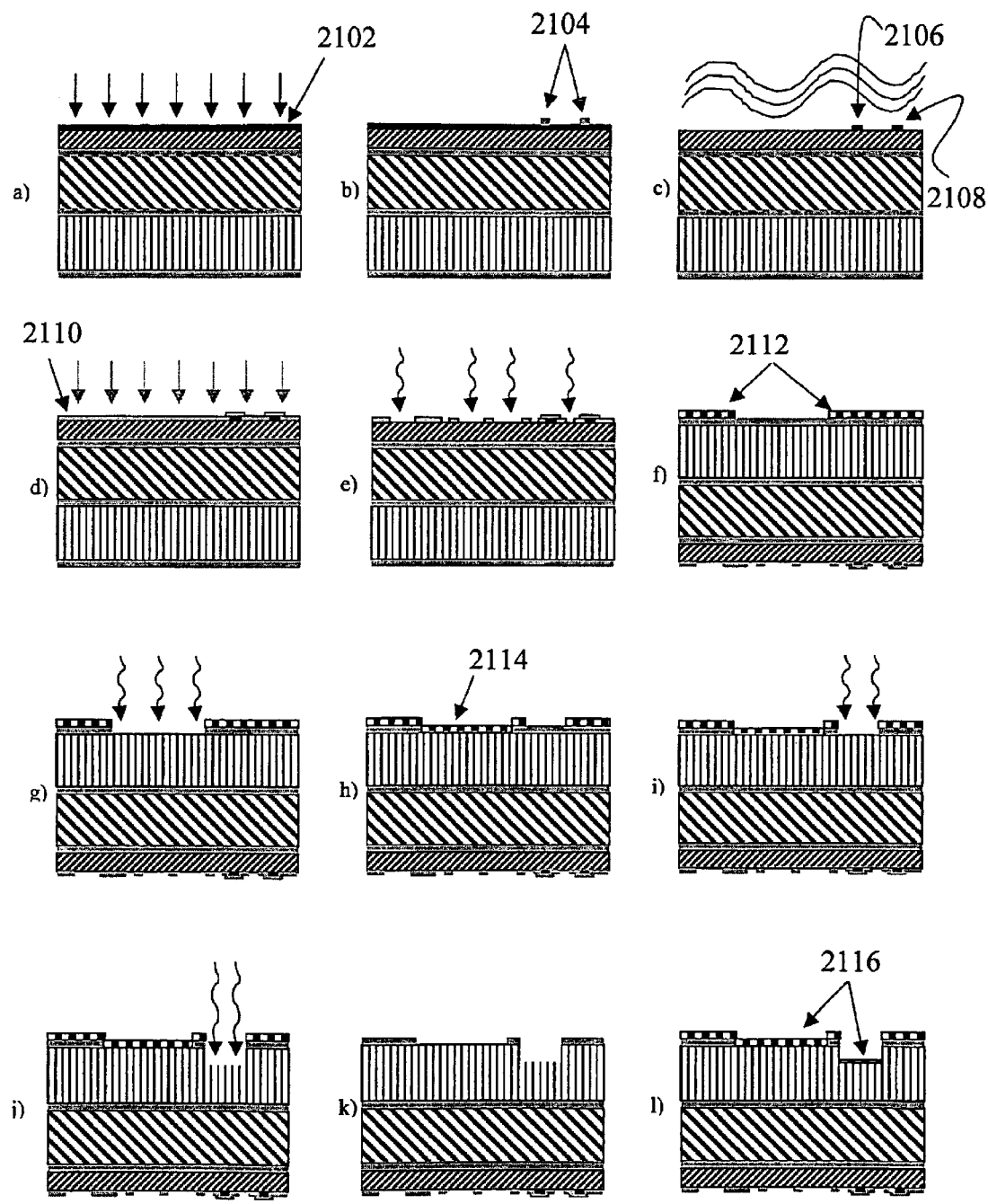
FIG. 21 shows an exemplary process for the fabrication of a bouncing mode micro-mirror using a double-active-layer SOI wafer.
Figure 21:
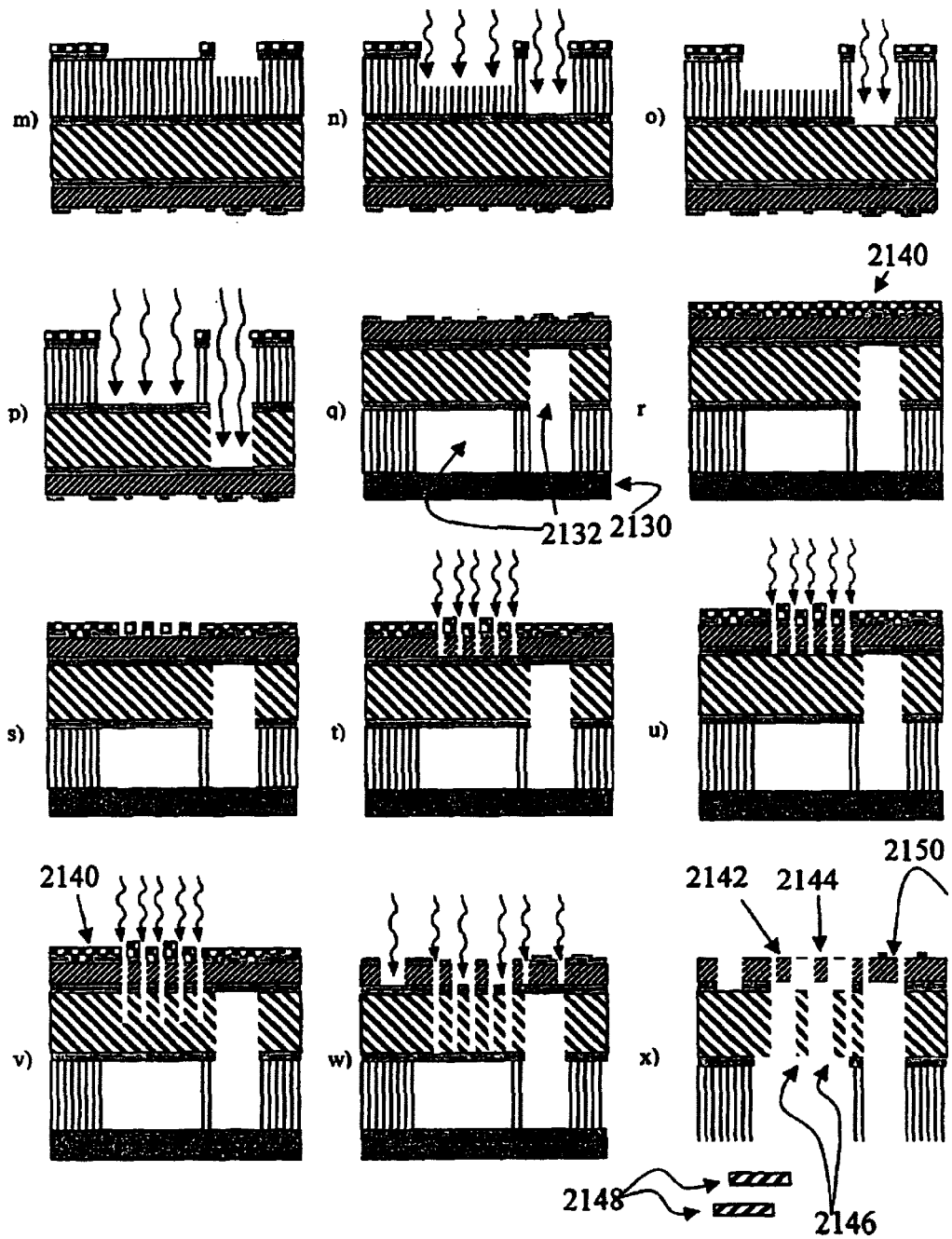

FIGS. 4–13 describe the invention schematically in conceptual terms. FIGS. 14–19 describe the invention in specific MEMS geometries and designs, applicable for example to silicon or silicon on insulator (SOI) MEMS processes. FIGS. 20, 21 illustrate schematically the steps of a silicon MEMS process used to fabricate a preferred embodiment of the bouncing mode micro-mirror device of the present invention.

Figure 4:
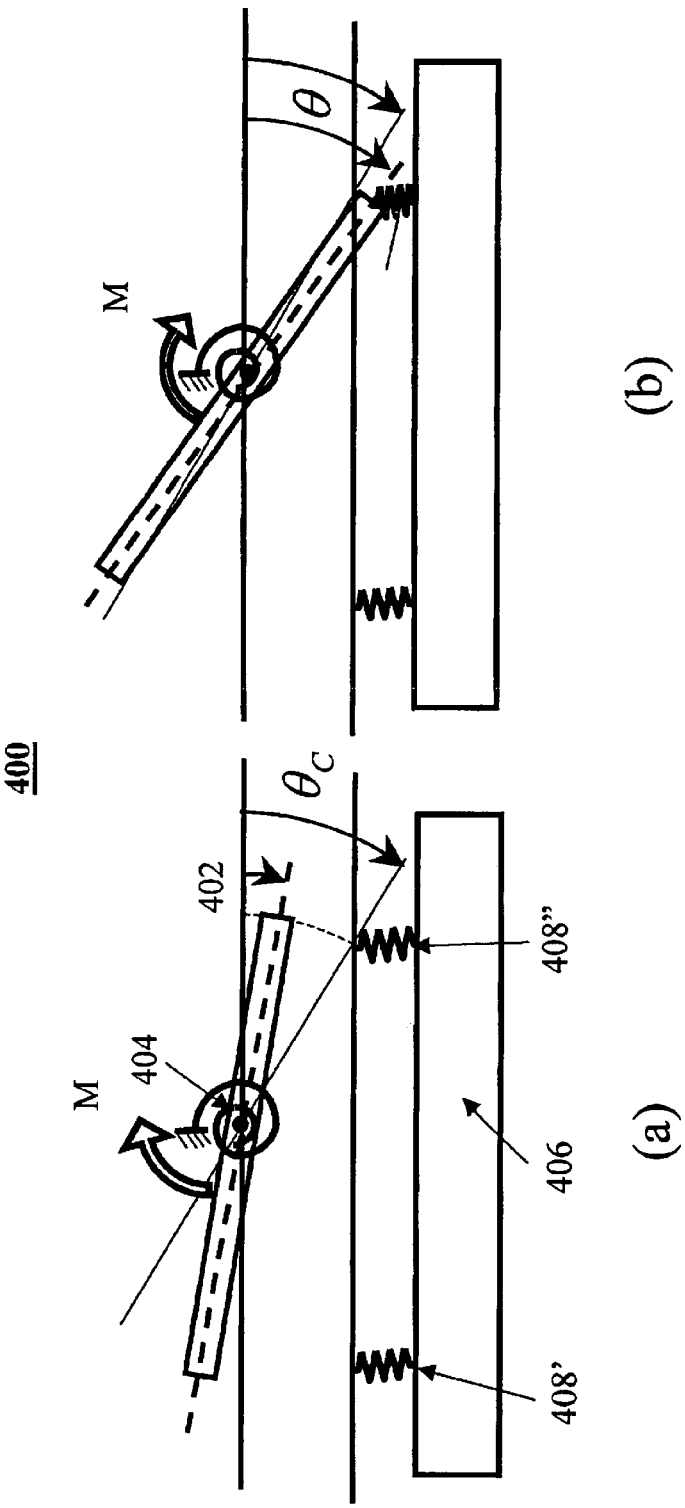
FIG. 4 shows a concept of a bouncing mode mirror and its operation principle according to the present invention.
Figure 5:
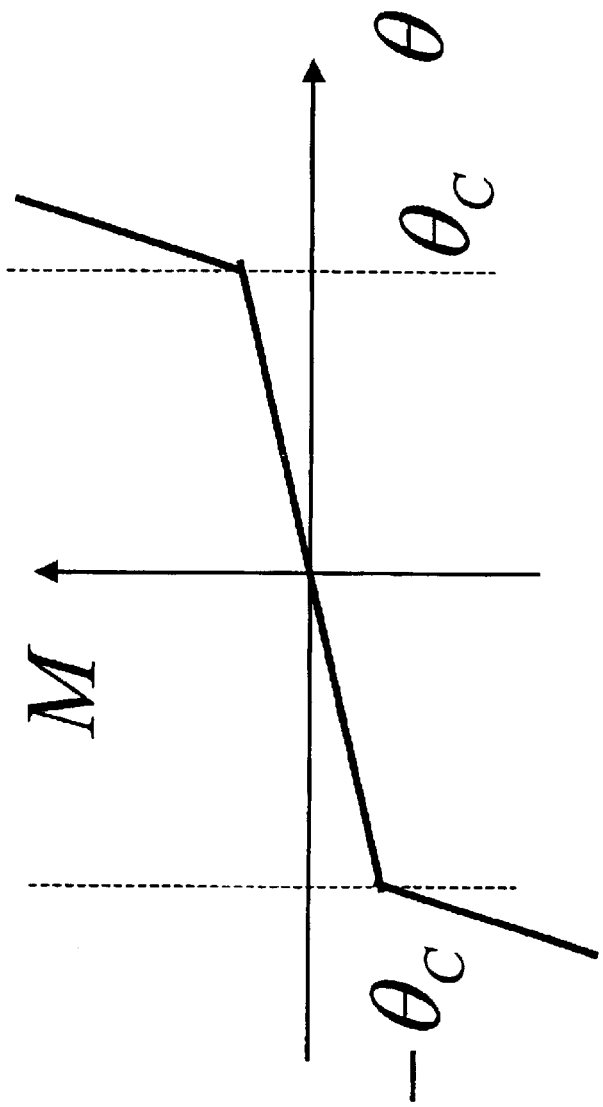
FIG. 5 shows schematically the dependence of the torsion stiffness (moment) on the tilting angle in the device of FIG. 4.

FIG. 4 shows schematically the concept of a bouncing mode micro-mirror device 400 and its operation principle according to the present invention. Device 400 comprises in (state a) a mirror 402 suspended on a torsion (tilt) axis 404 above a base plane 406. Under actuation, the mirror tilts (rotates) around axis 404 through a tilt angle θ. Inventively and in contrast with prior art tilt mirrors, device 400 comprises at least one pair of nonlinear stiffness elements (e.g. elastic "bouncers" made of cantilevers, beams or strips or pre-curved nonlinear stiffness elements shown exemplarily in FIGS. 12 and 18) 408' and 408" that come into contact with the mirror when the tilt angle θ is larger that some prescribed contact angle value $θ_c$. The following discussion of FIGS. 4–11 refers specifically to bouncers. Coming in pairs, the bouncers are preferably (although not necessarily) positioned symmetrically relative to (i.e. on both sides of) tilt axis 404. When contacted by the mirror (state b), elements 408' and 408" invert the mirror movement because of the increased torsion stiffness, as shown in FIG. 5. The nonlinear stiffness element (made of a particular material, e.g. silicon) may be designed and optimized such as to achieve a particular characteristic (bouncing effect) in response to an applied actuation force, using well known rules.

FIG. 5 shows schematically the dependence of the torsion stiffness (moment) M on tilt angle θ in the device of FIG. 4. The torsion stiffness is composed of the stiffness of torsion axis 404 and of the additional stiffness of a bouncer 408' or 408" on the tilting angle θ. When the mirror contacts the bouncer, i.e. when $θ>θ_c$, the stiffness (defined by the slope of the M vs. θ curve) increases significantly. This provides a saturation-type, stiff nonlinearity necessary for the formation of the triangular signal.

Figure 6:
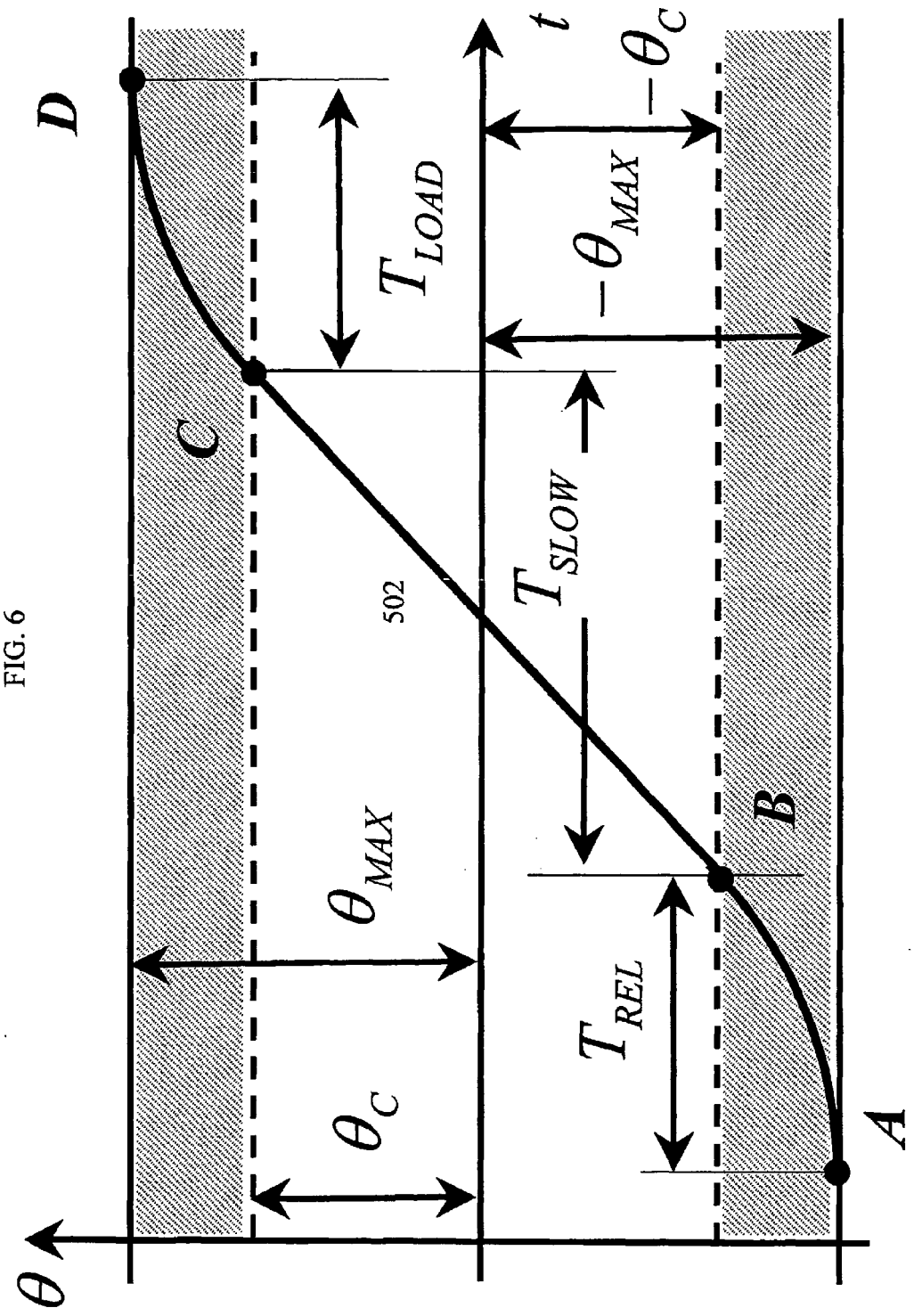
FIG. 6 illustrates schematically motion stages of a bouncing mode mirror as in FIG. 4.

FIG. 6 illustrates schematically motion stages (as expressed by a curve 602 showing a tilt angle θ vs. time t) of a bouncing mode mirror as in the device of FIG. 3. Curve 602 comprises 3 stages: a first fast stage between point A and B defined by a release time $T_{REL}$, a second slow stage between points B and C defined by a time $T_{SLOW}$ and a third fast load stage between points C and D defined by a time $T_{LOAD}$. During the slow stage (in which the mirror is not in contact with the bouncer), the mirror rotates with an almost constant angular velocity that is determined by the bouncer and the energy provided by the actuator. The strain energy stored in the deformed bouncer is transformed into the kinetic energy of the mirror. During the fast stages (i.e. when $θ>±θ_c$) the mirror is in contact with the bouncer and the kinetic energy of the mirror is transformed back into the strain energy of the bouncer. Since the stiffness of the bouncer is much larger that the stiffness of the torsion axis, the additional angle $θ_{MAX}-θ_c$ that corresponds to the deformation of the bouncer is much smaller that the total tilting angle of the mirror $θ_{MAX}$.

In summary, the operational mode of the bouncing mode mirror, as illustrated in FIGS. 4–6 and as explained in more detail in the Krylov and Barnea reference above, incorporates a contact event between the mirror and an elastic constraint followed by a bouncing event and an inversion of motion. As shown in FIG. 5, the stiffness of the system is angle dependent.

Figure 7A:
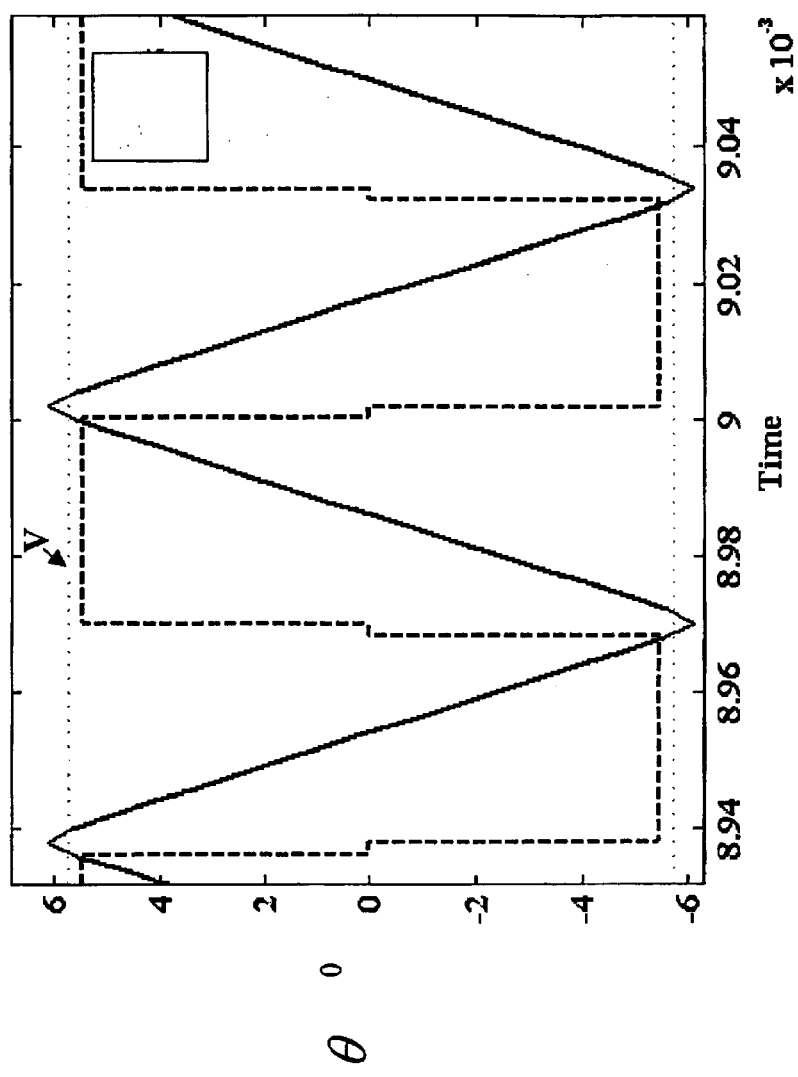
FIG. 7a illustrates the time history (angle-time dependence) of a bouncing mode mirror motion obtained by a simulation.
Figure 7B:
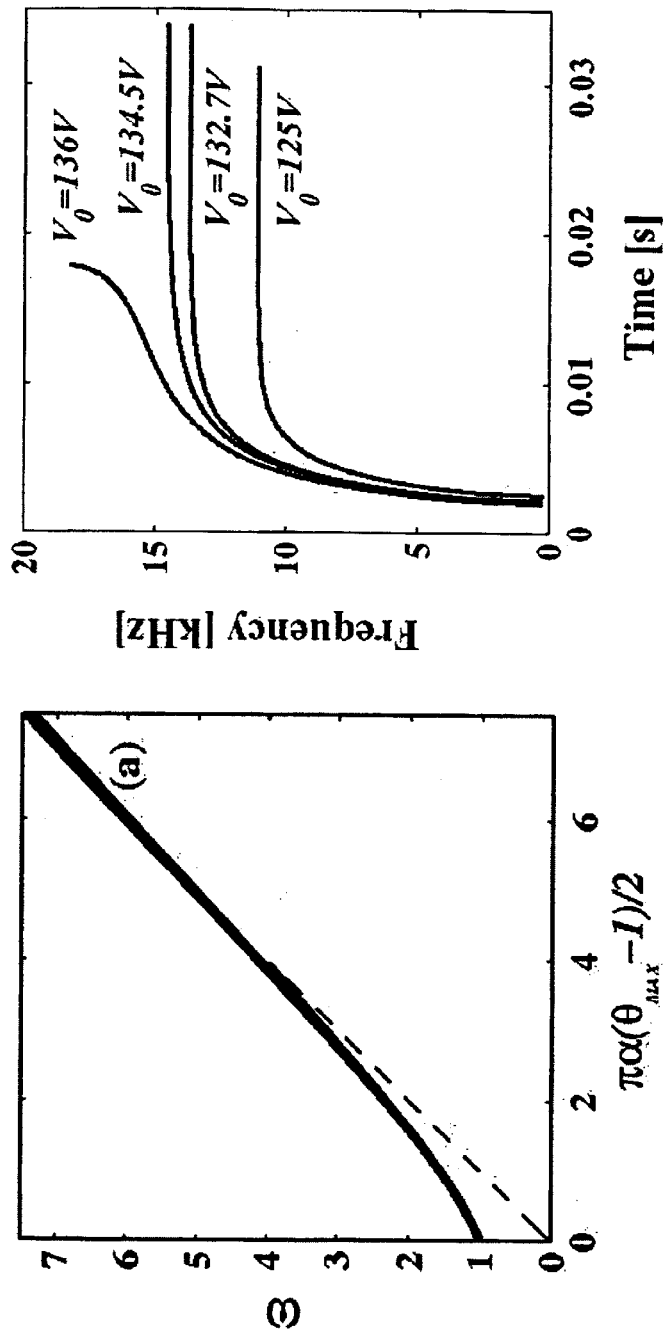
FIG. 7b illustrates the dependence of the natural frequency of the mirror on the deformation of the bouncer.

FIG. 7a illustrates the time history (tilt angle θ vs. time t dependence) of a bouncing mode mirror motion obtained by a simulation. Details may be found in the Krylov and Barnea reference. The simulation uses a piecewise constant-in-time voltage actuation signal marked by (dotted line) V and applied to the electrodes, and the result (full line) is a triangular angle-time dependence. The angular velocity is practically constant. FIG. 7b illustrates on the left the dependence of the natural frequency of the mirror ω on the deformation of the bouncer. Starting from some value, the frequency is a linear function of the bouncer deformation. This property is very useful for the control of the mirror frequency and permits the tuning of the mirror natural frequency in a very large range. As shown by the "Response frequency vs. voltage" graph in the right box in FIG. 7b, the response resonant frequency may be tuned by voltage control. The tuning of the resonant frequency through the control of the applied voltage permits the synchronization of the response of a micro-fabricated device with a video signal.

The "quality" of the response shown in FIG. 7a, namely the linearity of the rotation angle in time, is defined by the ratio $M_B/M_{TA}$ between the stiffness of the elastic bouncer $M_B$ and of the torsion axis of the mirror $M_{TA}$. An increase in this ratio can be achieved by the hardening of the bouncer or alternatively by the softening of the torsion axis. The natural frequency of the mirror is defined mainly by the deformation of the elastic bouncer and consequently by the actuation voltage, and is practically independent of the stiffness of the torsion axis $M_{TA}$. This suggests that $M_{TA}$ has to be reduced to a minimum. This reduction can be achieved by the design means and is limited only by the requirements of the minimal out-of-plane stiffness of the axis.

Figure 8:
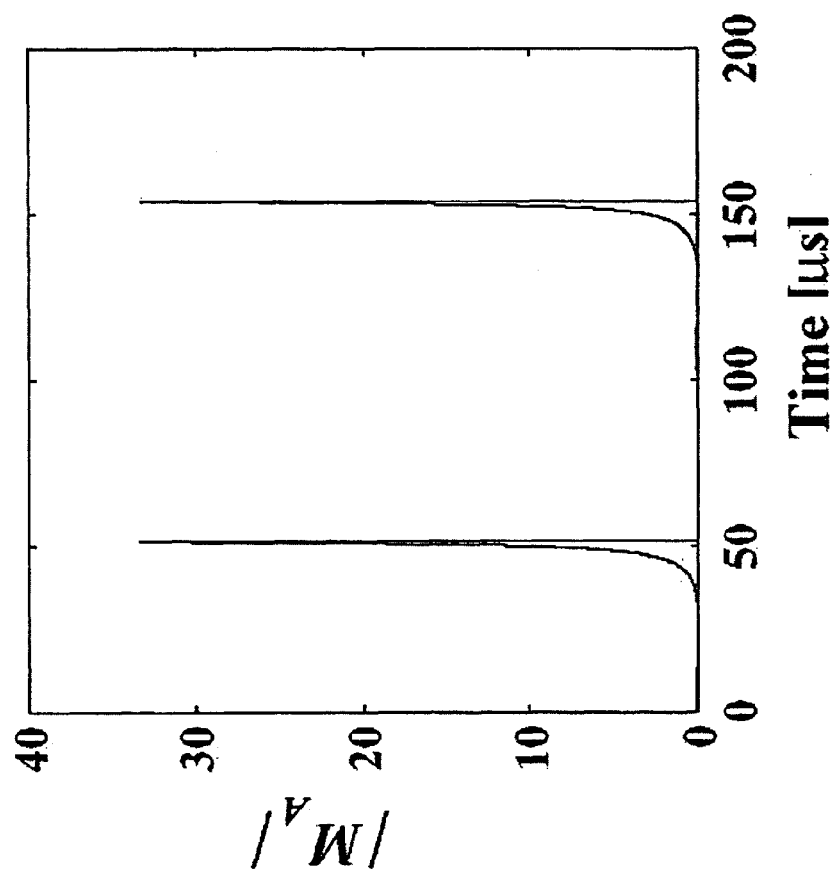
FIG. 8 illustrates the simulated time history of an actuation moment $M_A$ resulting from a bouncing event.

FIG. 8 illustrates the time history of the resulting actuation moment $M_A$ The proximity of the mirror edge to the electrodes results in the increase in the actuation moment. Attractive electrostatic forces large enough are used to deform the bouncer and invert the velocity. The elastic energy stored in the bouncer is transformed into a repelling force acting on the mirror. The combination of additional stiffness element and parallel plate electrodes working in a proximity mode permit the achievement of very large repelling forces in the electrostatic actuator.

Figure 9:
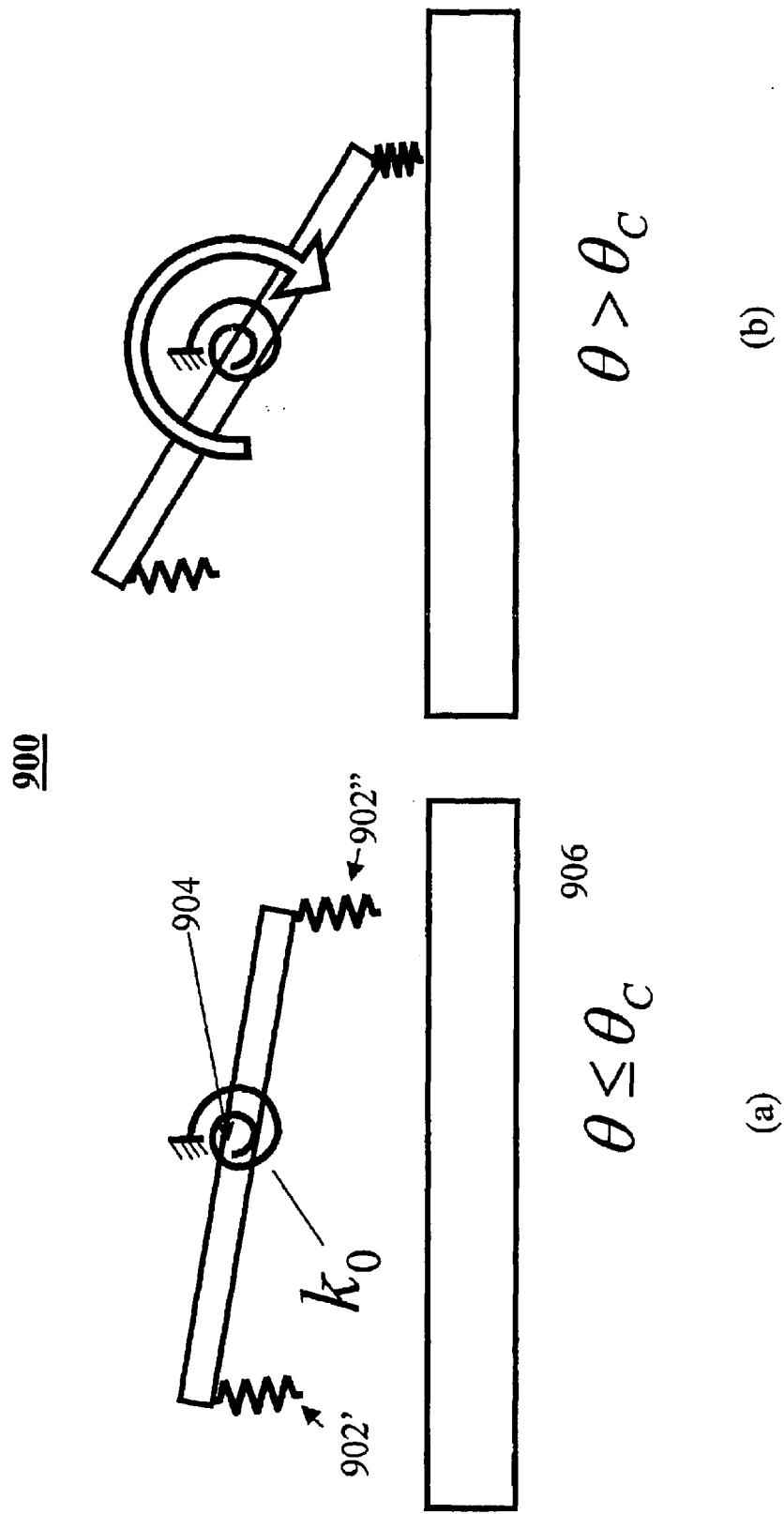
FIG. 9 shows schematically yet another embodiment of a bouncing mode micro-mirror device in which the bouncers are connected to the mirror.

FIG. 9 shows schematically yet another embodiment of a bouncing mode micro-mirror device 900 according to the present invention. In FIG. 9, least one pair of bouncers 902' and 902" is attached to a mirror 904 instead of to a substrate 906. Bouncers 902 are now mobile, in contrast to bouncers 408 (FIG. 4), which are attached to the substrate and immobile. The advantage of this configuration is a simpler fabrication process, since bouncers 902 can be fabricated in the same layer as the mirror (e.g. an active Si layer in a SOI substrate). As in FIG. 4, (a) shows the mirror before it touches the substrate through the bouncer, and (b) shows the mirror in contact with the substrate through the bouncer.

FIG. 10 shows in (a) schematically yet another embodiment of a bouncing mode micro-mirror device 1000. The configuration is similar to that of FIG. 4, except that the device comprises at least one additional pair of "softer" (relative to the first pair) bouncers 1002' and 1002". More pairs of bouncers with varying softness are of course included in the definition of "at least one additional pair". Bouncers 1002' and 1002" are operative to manage the contact velocity in order to improve reliability and soften the impact. A stiffness-angle dependence plot similar to that in FIG. 4 is shown in (b) for this configuration. One can see two added sections 1004 and 1006 with slopes intermediate to the slope of the "slow" section and that of the two "fast" sections. These sections show that the impact velocity is lower.

Figure 11:
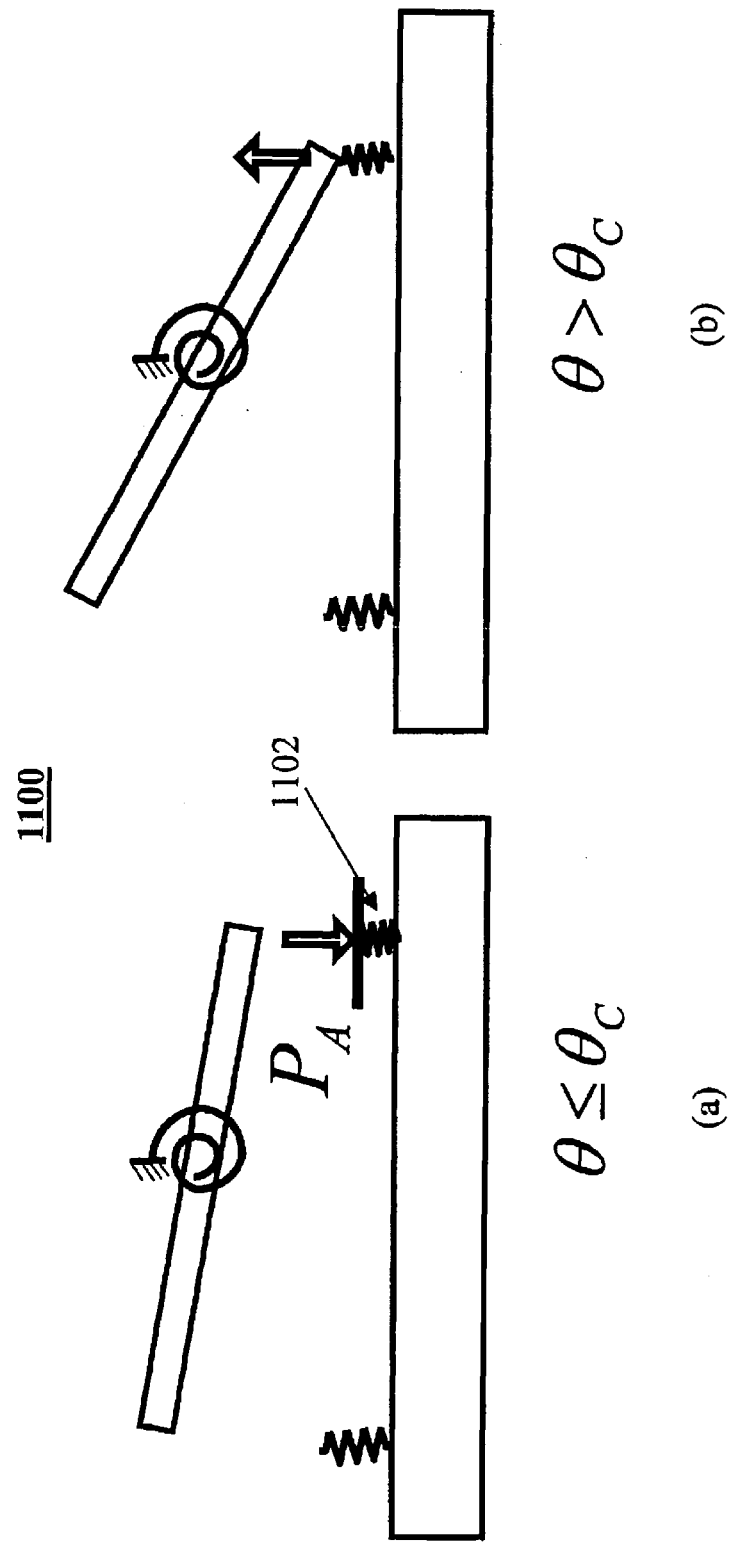
FIG. 11 shows schematically yet another embodiment of a bouncing mode micro-mirror device that comprises an active, independently deformable bouncer.

FIG. 11 shows schematically yet another embodiment of a bouncing mode micro-mirror device 1100 that comprises at least two active, independently deformable bouncers 1102. An active bouncer 1102 is deformed not by the mirror but by an additional force $P_A$, which is applied directly to the bouncer (stage a, when $\theta<\theta_c$), independently of the mirror motion. This permits to store a larger energy in the bouncer in order to provide non-symmetric saw tooth signals and to reduce the impact velocity to zero, since the kinetic energy of the mirror is not required anymore for the bouncing deformation. In stage b when $\theta>\theta_c$, the bouncer previously deformed by the force returns its energy to the mirror.

Figure 12A:
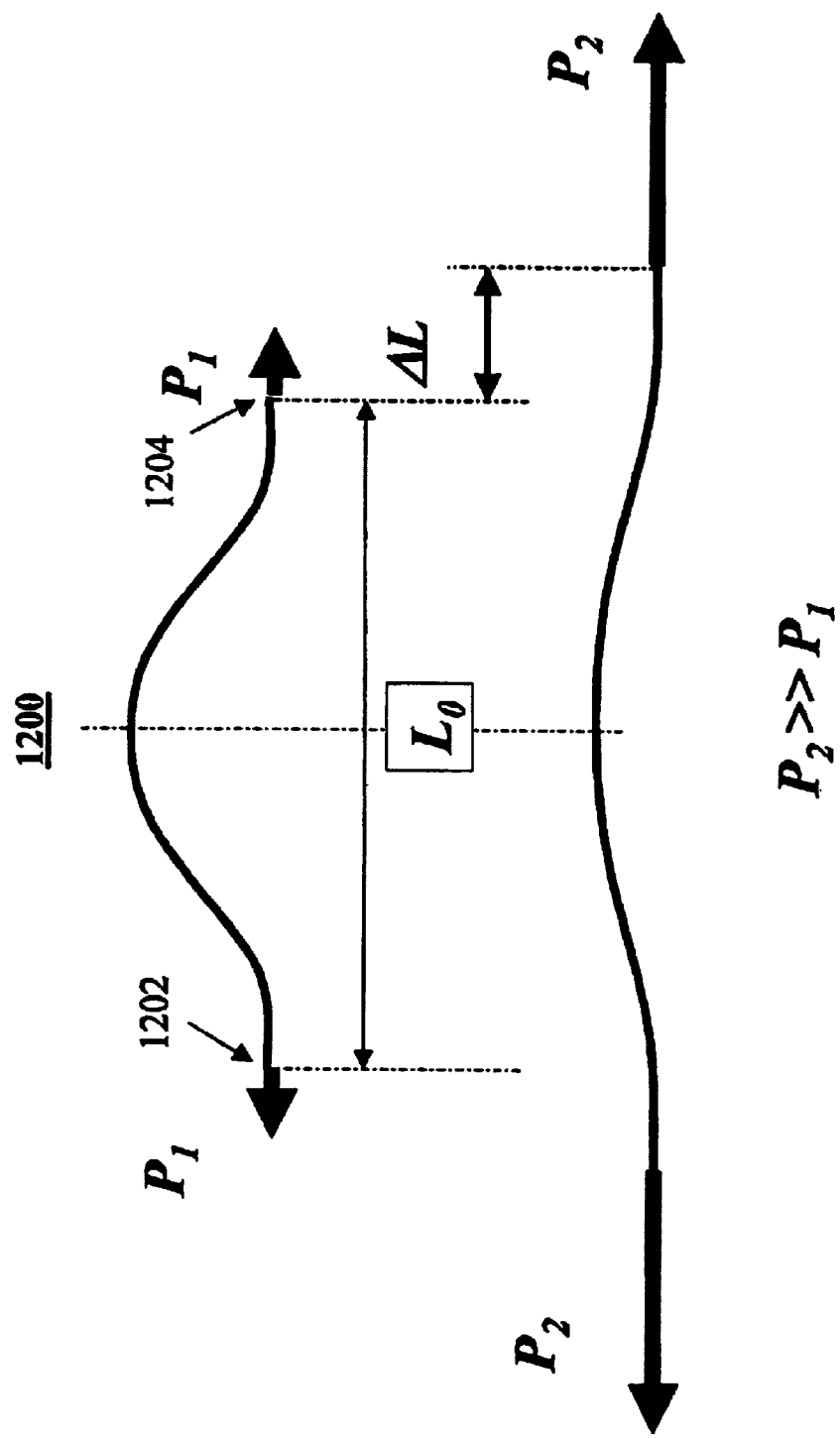
Figure 12B:
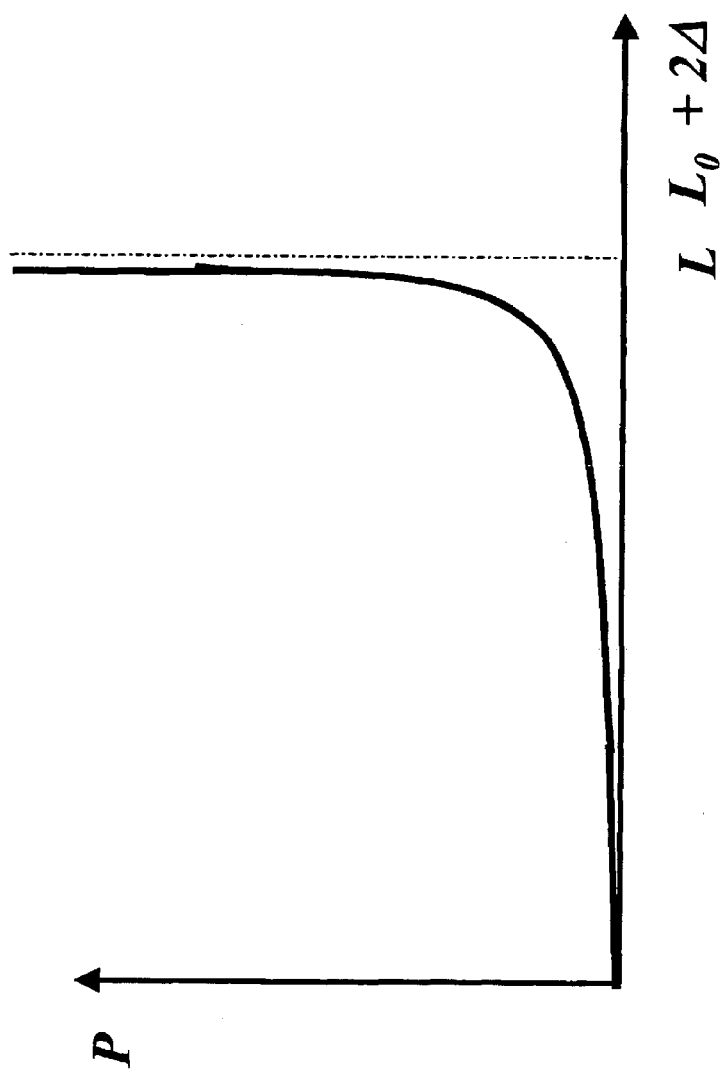
Figure 13A:
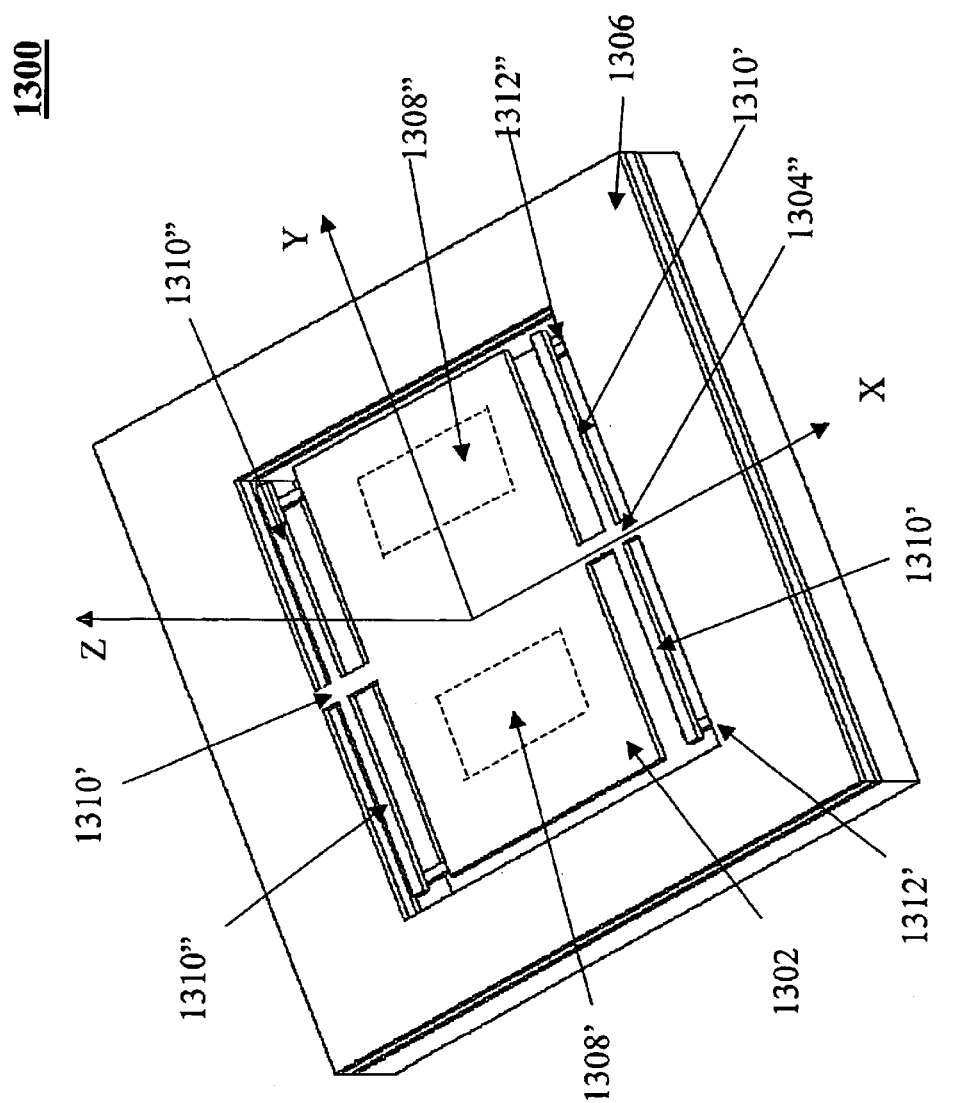
FIG. 13 shows an embodiment of a parallel plate actuated bouncing mode mirror with bouncers: a) isometric view; b) top view; c) side view without actuation; d) side view with actuation.
Figure 13B:
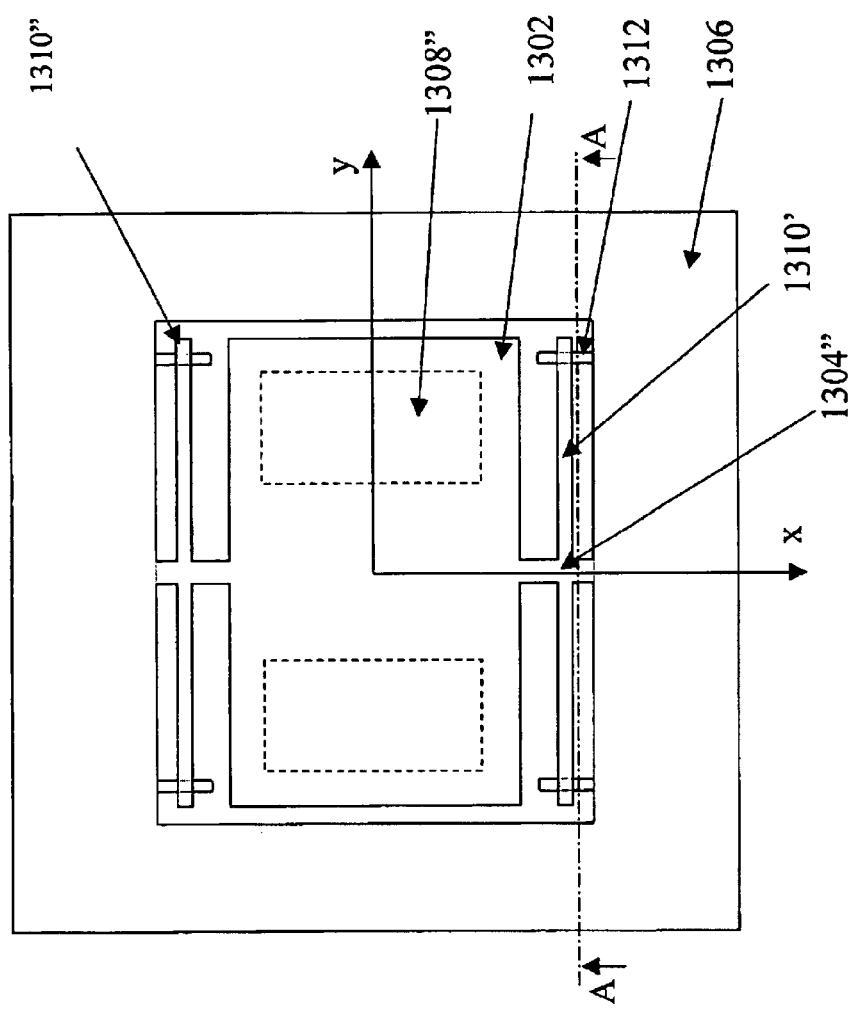
Figure 13C:
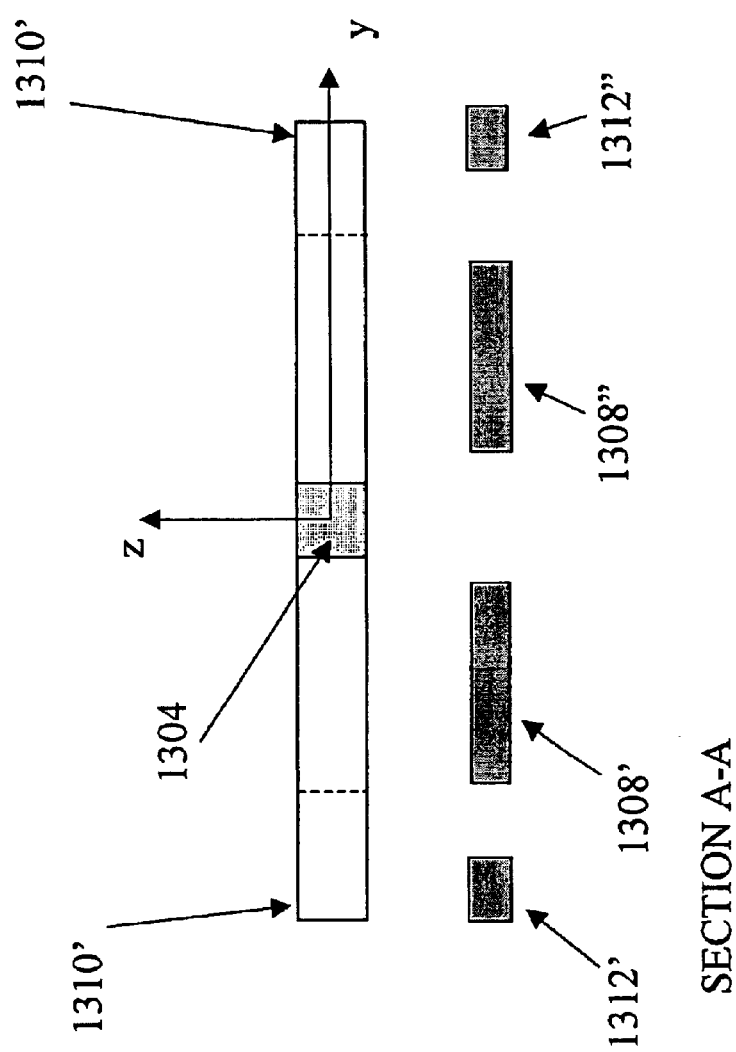
Figure 13D:
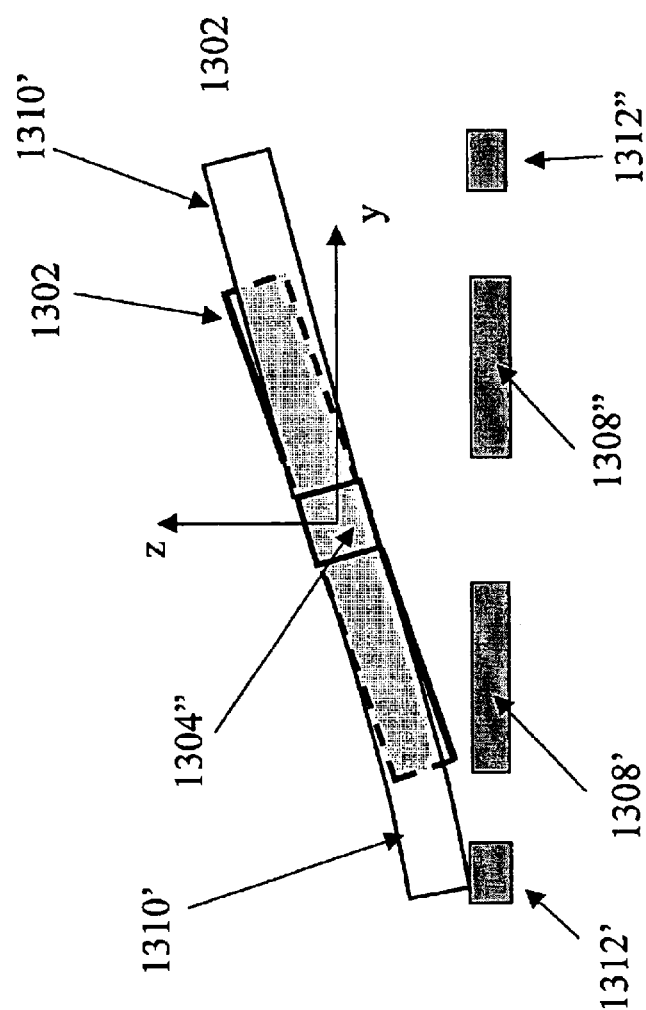

FIG. 12 shows schematically a conceptual pre-curved nonlinear stiffness element (e.g. a beam, a string, etc.) 1200 with two ends 1102 and 1104 that may be advantageously used in the bouncing micro-mirror devices of the present invention. A "pre-curved" element in the present invention is an element with at least one section having a radius of curvature that is not infinite. Element 1200 is pre-curved in such a way that in an original (non-stressed) pre-curved state, the distance between its two ends is $L_0$. A force P with a starting value of P1 is applied to ends 1102 and 1104. Length $L_0$ increases by an elongation $\Delta L$ when the force reaches a value P2. FIG. 12b illustrates the dependence between the applied force P and the elongation L of element 1200. The dependence of the elongation on the force is highly nonlinear and is a function of the initial shape of element 1200. In order to straighten the element completely, a theoretically infinite force needs to be applied. Due to its high nonlinearity, the element characteristics are close to those of an ideal bouncer. The dimensions of a pre-curved element of the present invention may be designed and optimized to achieve a particular characteristic (bouncing effect) in response to an applied force. Implementations of element 1200 as a nonlinear stiffness element are shown in the systems in FIGS. 15–17.

FIG. 13 shows in (a) isometric view and (b) top view an embodiment of a parallel plate actuated bouncing mode mirror device 1300 that includes bouncers (bouncers) of the present invention connected to a mirror. This embodiment implements the concept shown in FIG. 9. Device 1300 comprises a mirror 1302 situated in an XY plane and connected by two torsion bars 1304' and 1304" to a substrate 1306. Mirror 1302 is rendered electrically conductive (e.g. by a deposited metallization) so that it can be pulled into the −Z direction by one of two electrodes 1308' and 1308" located in a lower XY plane (below and separate from the mirror plane). Device 1300 further comprises at least one pair of spring beams 1310' and 1310" that are fixedly connected to (and in fact preferably part of the same layer as) torsion bars 1304. Beams 1310' and 1310" serve as impact nonlinear stiffness springs. Device 1300 further comprises at least one pair of stoppers 1312' and 1312" that stop the movement of the mirror when the mirror rotates around torsion bars 1304, by contacting spring beams 1310. In essence, the bouncers in this embodiment are beams connected at one end to the mirror (or to the torsion bar of the mirror), the other end being free. The beam bends upon contact with a stopper, building up energy that eventually reverses the mirror rotation, bouncing it back. The location of the bouncers (when connected to the torsion bar) may be optimized to give the mirror a high rotation angle. Enlargements of the area of contact between beams 1310 and stoppers 1312 are shown in FIGS. 13(c) and (d). FIG. 13(c) shows a spring beam that is not in contact with a stopper. FIG. 13(d) shows a spring beam during contact with stopper 1312'. The bending of the beam during contact is shown in a highly exaggerated way, for illustration purposes only.

Figure 14A:
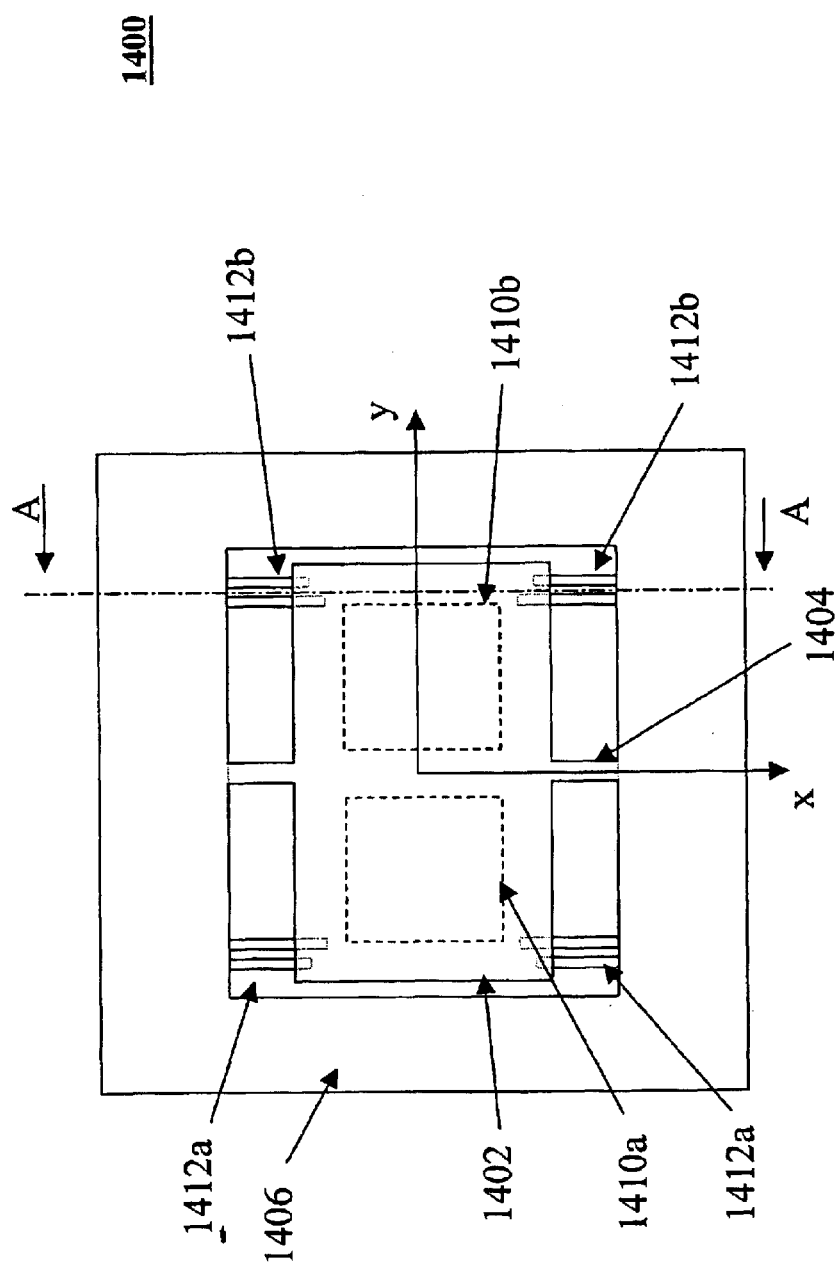
FIG. 14 shows in (a) top view, and (b) and (c) isometric views an embodiment of a mirror device with a bouncers driven by parallel plate electrostatic actuators.
Figure 14C:
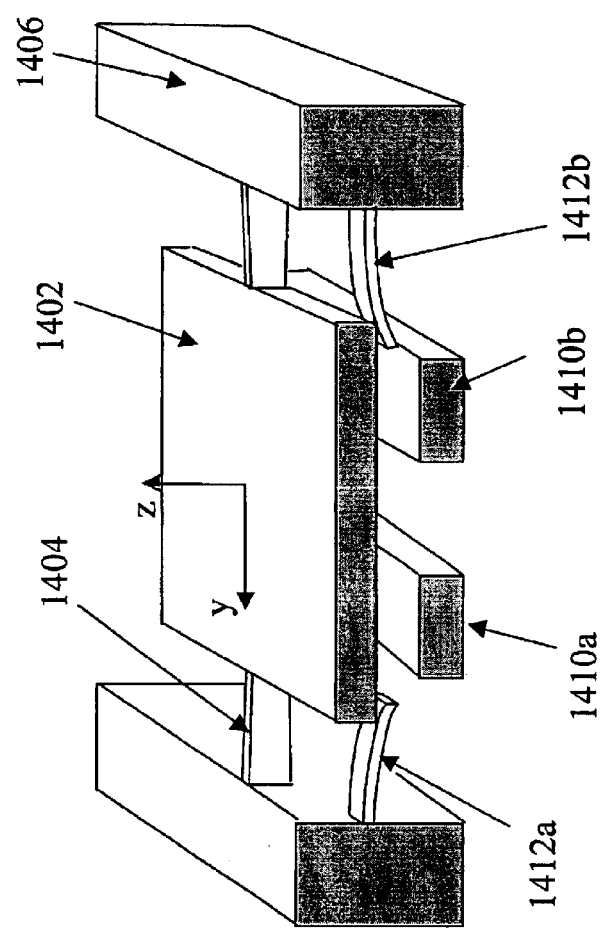
Figure 15A:
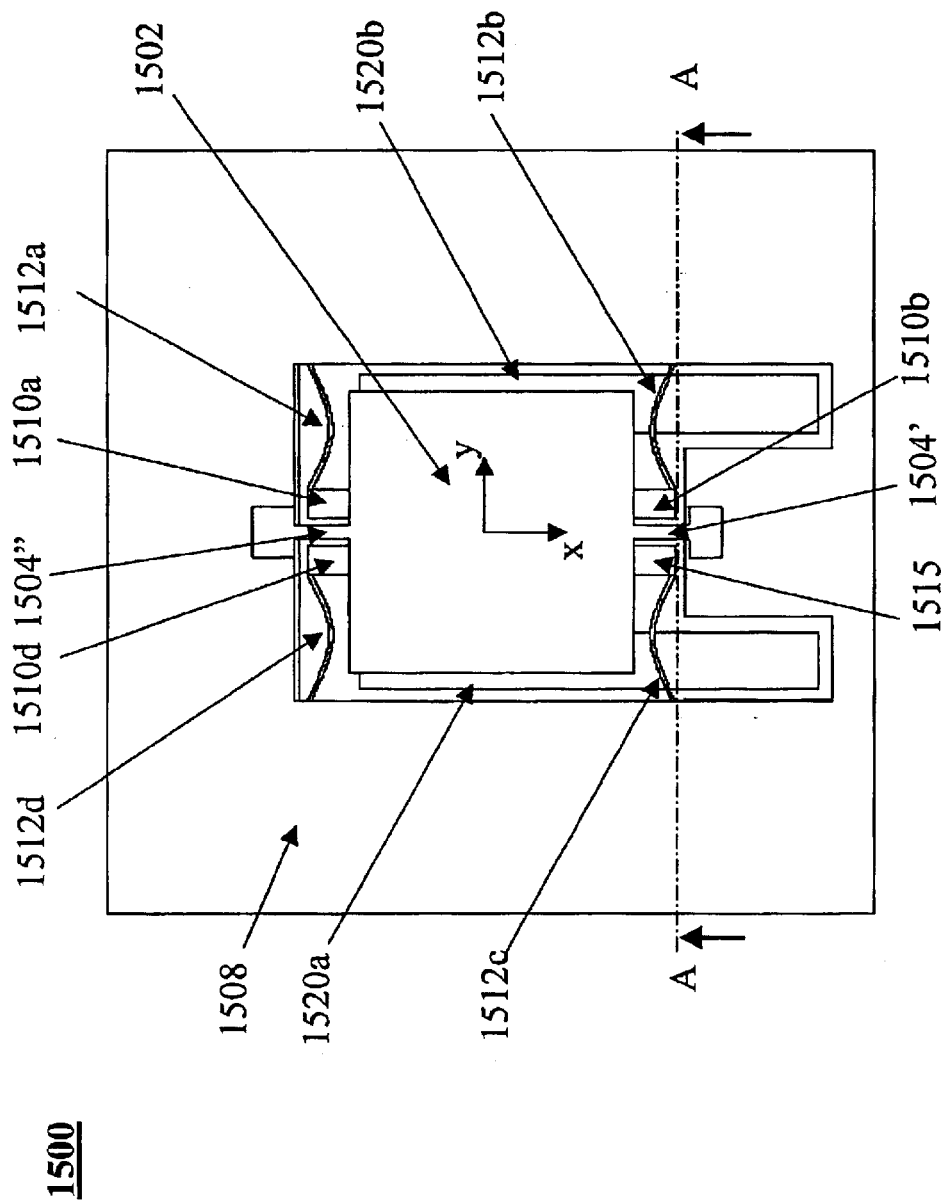
FIG. 15 shows: (a) top view and, (b) isometric view an embodiment of a rotational parallel plate actuated bouncing mode mirror device with pre-curved nonlinear stiffness drive elements; (c) isometric view emphasizing a side with section A—A; (d) section A—A before deformation; (e) section A—A after deformation by electrostatic forces.
Figure 15B:
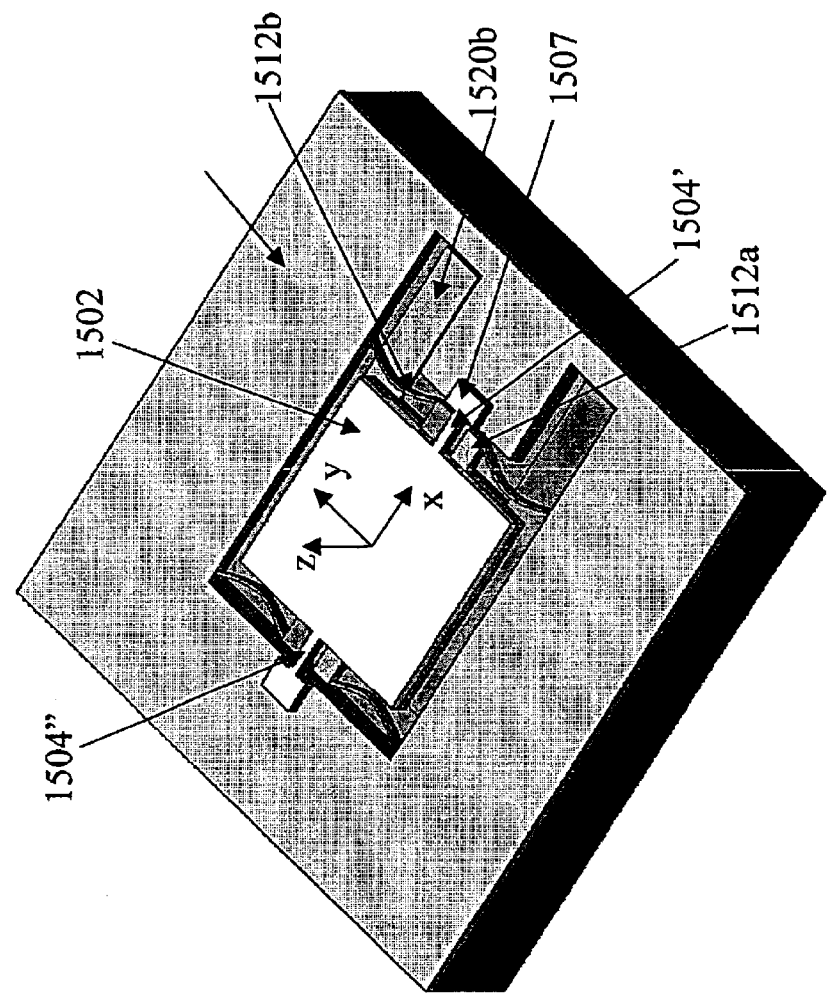
Figure 15C:
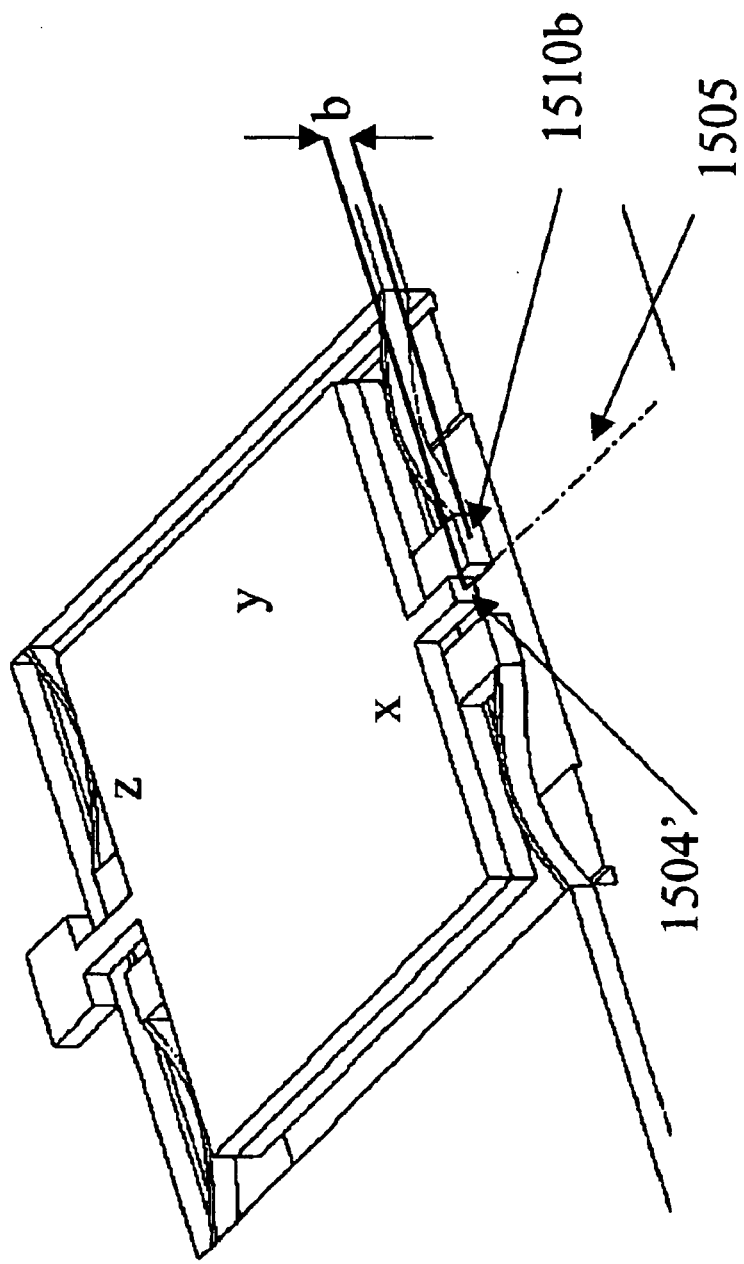
Figure 15D:
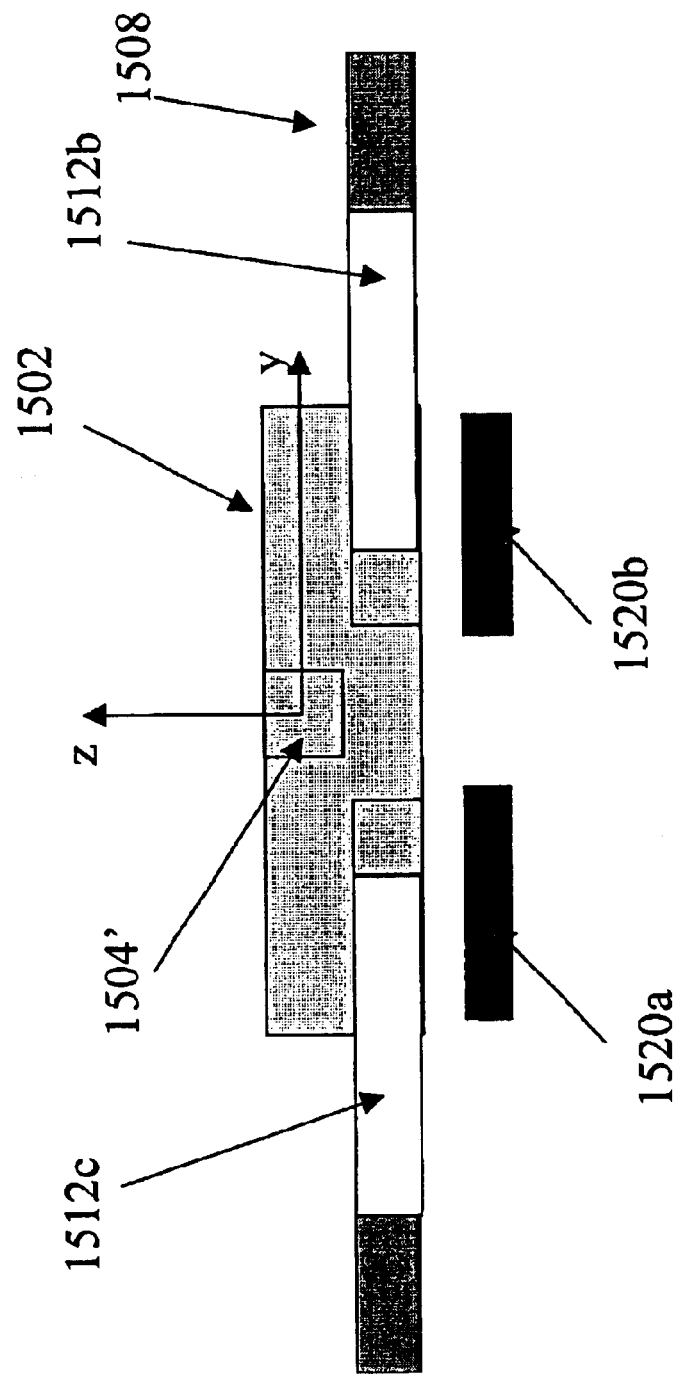
Figure 15E:
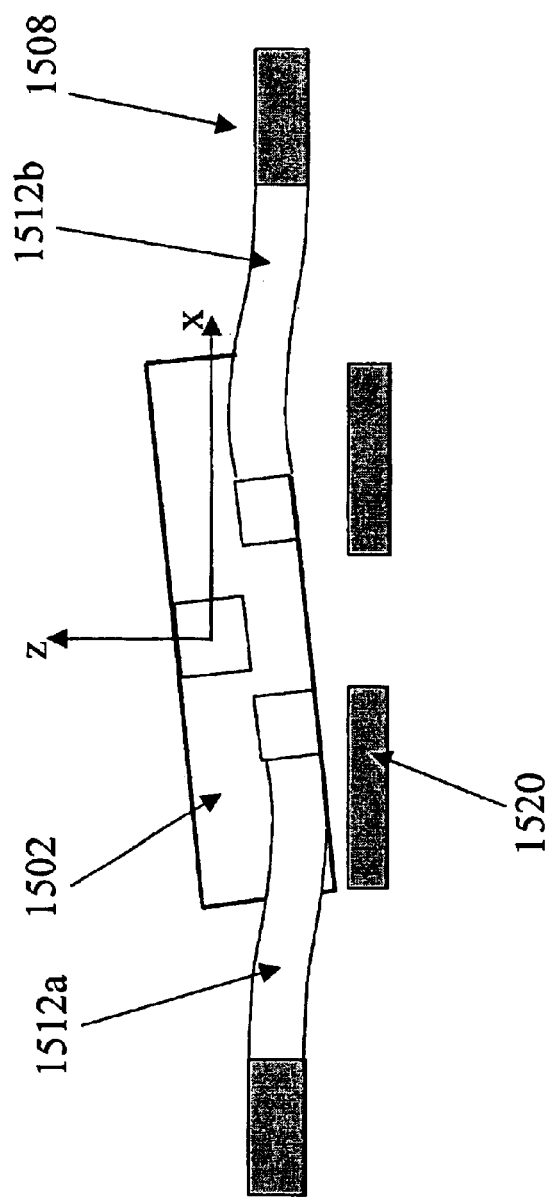

FIG. 14 shows an embodiment of a mirror device 1400 with at least one pair of bouncers (spring beams) 1412 connected to a substrate 1406 and driven by parallel plate electrostatic actuators: (a) top view, (b) and (c) isomeric views taken along a section A—A of FIG. 14(a). This embodiment implements the concept shown in FIGS. 4 or 10. Only one pair of spring beams is shown in (b) and (c), although it is understood that two or more springs with different stiffness characteristics may be attached (in pairs) to the substrate on each side, as shown exemplarily in FIG. 14(a). Device 1400 comprises a mirror 1402 in plane x-y connected by at least one pair of torsion beams 1404 to a substrate 1406, and pulled in −z (into the page) direction by one of two electrodes 1410a, 1410b located in a lower x-y plane layer. The mirror rotates until it contacts with its edge at least one spring beam 1412 that is clamped to substrate 1406 at the electrode level (plane). When more than one beam is used, each beam may have different elastic properties, for example the same cross section but different length, as shown in FIG. 14(a). The mirror deflects the springs and bounces back. In other words, in this embodiment the bending beam is fixedly attached at one end to the substrate instead of to the mirror. The deflection of the springs is shown in a highly exaggerated way in (c).

FIG. 15 shows in (a) top view and in (b) isomeric view an embodiment of a rotational parallel plate actuated bouncing mode mirror device 1500 with pre-curved nonlinear stiffness elements. This embodiment makes use of pre-curved C-shape elements of the type shown in FIG. 12 and FIG. 18a. Device 1500 comprises a mirror 1502, in this case rectangular but in general of any regular symmetric shape (for example round). Mirror 1502 is situated in an XY plane and connected by two torsion bars 1504' and 1504" aligned along a common torsion axis 1505 and ending each in elevations (or "pads") 1507 on top of a substrate 1508. Device 1500 further comprises two pairs of short "offset" beams 1510a and 1510d, and 1510b and 1510c, which are located in a lower part of the mirror, at an offset b from the top surface, see section A—A view in FIG. 15(c). The offset beams are respectively connected by at least one pair (in this case two pairs) of preferably C-shaped spring beams 1512a and 1512d, and 1512b and 1512c to substrate 1508. Device 1500 further comprises two electrodes 1520a and 1520b located below the mirror. Note that in principle the at least one pair of C-shaped (and more generally "pre-curved") beams may comprise only beams 1512a and 1512c, 1512b and 1512d, 1512a and 1512d, or 1512b and 1512c. FIGS. 15(d) and (e). FIG. 15(d) show side views of section A—A: (d) shows the C-shaped beams before deformation by the electrostatic force, while (e) shows them after deformation.

When the mirror and one of the electrodes 1520 are charged, the pull on spring beams 1512 (with eccentricity length b) yields a moment causing the rotation of the mirror in the opposite direction around torsion bars 1504 and common axis 1505. Due to the straightening, the C-spring beams have a stiffening type nonlinear characteristics required in order to produce "bouncing effect". It is emphasized that the C-shape springs are used for example only, and that other pre-curved nonlinear stiffness elements, for example V-shape, S-shape or Z-shape may be equally useful for the purposes set forth herein.

Figure 16A:
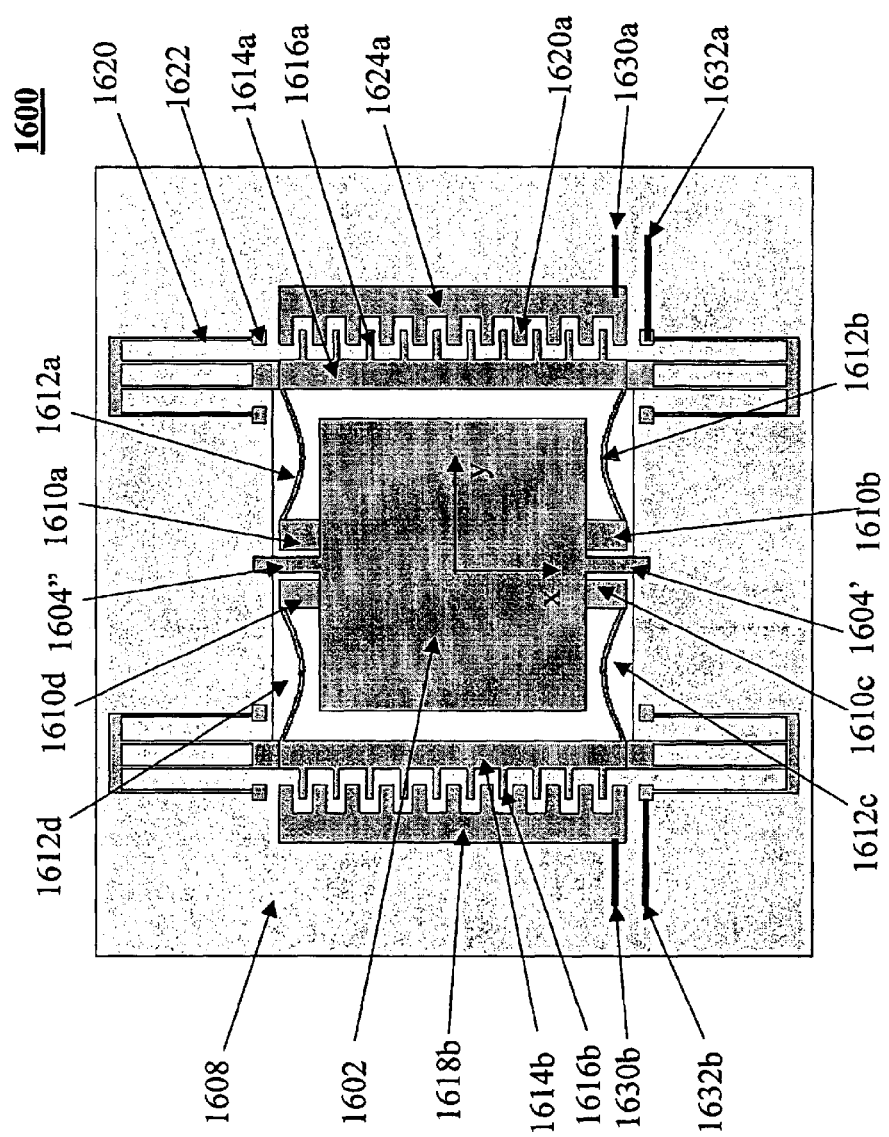
FIG. 16 shows in (a) top view and (b) isometric view an embodiment of a planar comb drive-actuated bouncing mode mirror device with pre-curved nonlinear stiffness elements.
Figure 16B:
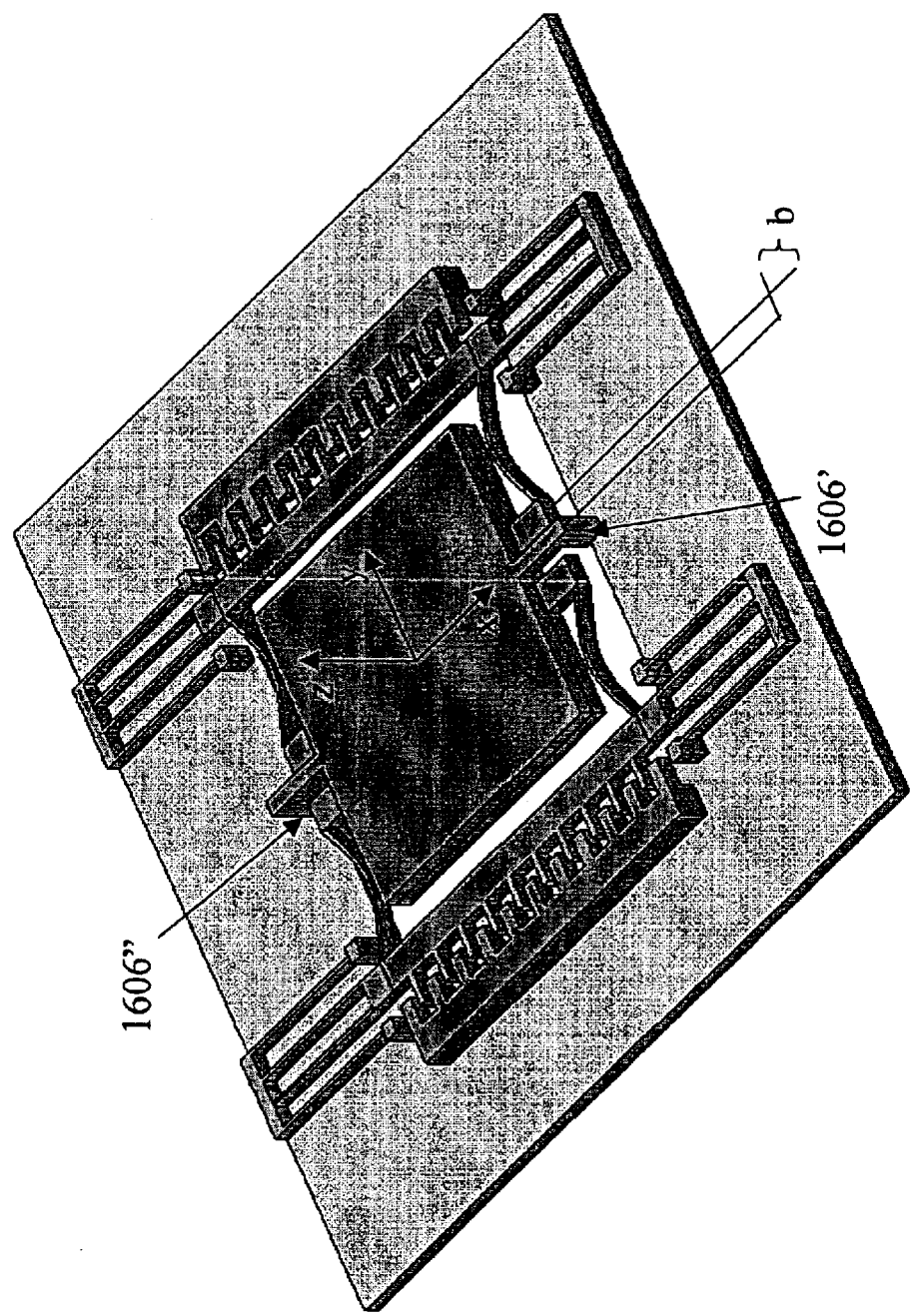

FIG. 16 shows in (a) top view and (b) isometric view an embodiment of a planar comb drive-actuated bouncing mode mirror device 1600 with pre-curved nonlinear stiffness drive elements actuated by planar comb drives. Device 1600 has elements 1602 to 1610 identical with respective elements 1502 to 1510 in FIG. 15. These include a mirror 1602, two torsion bars 1604' and 1604" elevations 1606' and 1606", substrate 1608, and two pairs of short "offset" beams 1610a and 1610d, and 1610b and 1610c located in a lower part of the mirror, at an offset b from the top surface (FIG. 16b). The offset beams are respectively connected by two pairs of preferably C-shaped spring beams 1612a and 1612d, and 1612b and 1612c to two planar comb drive rotors 1614a and 1614b that have a Y-direction degree of freedom by their connection to substrate 1608 through retaining beam springs 1620 on pads 1622.

When a comb drive stator 1624a with teeth 1620 and a comb drive rotor 1614a with teeth 1616 are charged through electrical conductors 1630a and 1632a, the eccentric pull (with eccentricity length b) yields a counter-clockwise rotation moment of mirror 1602 around torsion bars 1604. Comb drive stator 1618b and comb drive rotor 1614b yield similarly a clockwise rotation of the mirror. The C-spring beams have a nonlinear stiffness designed to transform the movement induced by the comb drives into a linear movement of the mirror (bouncing effect). Is is emphasized that the C-shape springs are used for example only, and that other shape non linear stiffness elements, for example V-shape, S-shape or Z-shape may be equally useful for the purposes set forth herein.

Figure 17A:
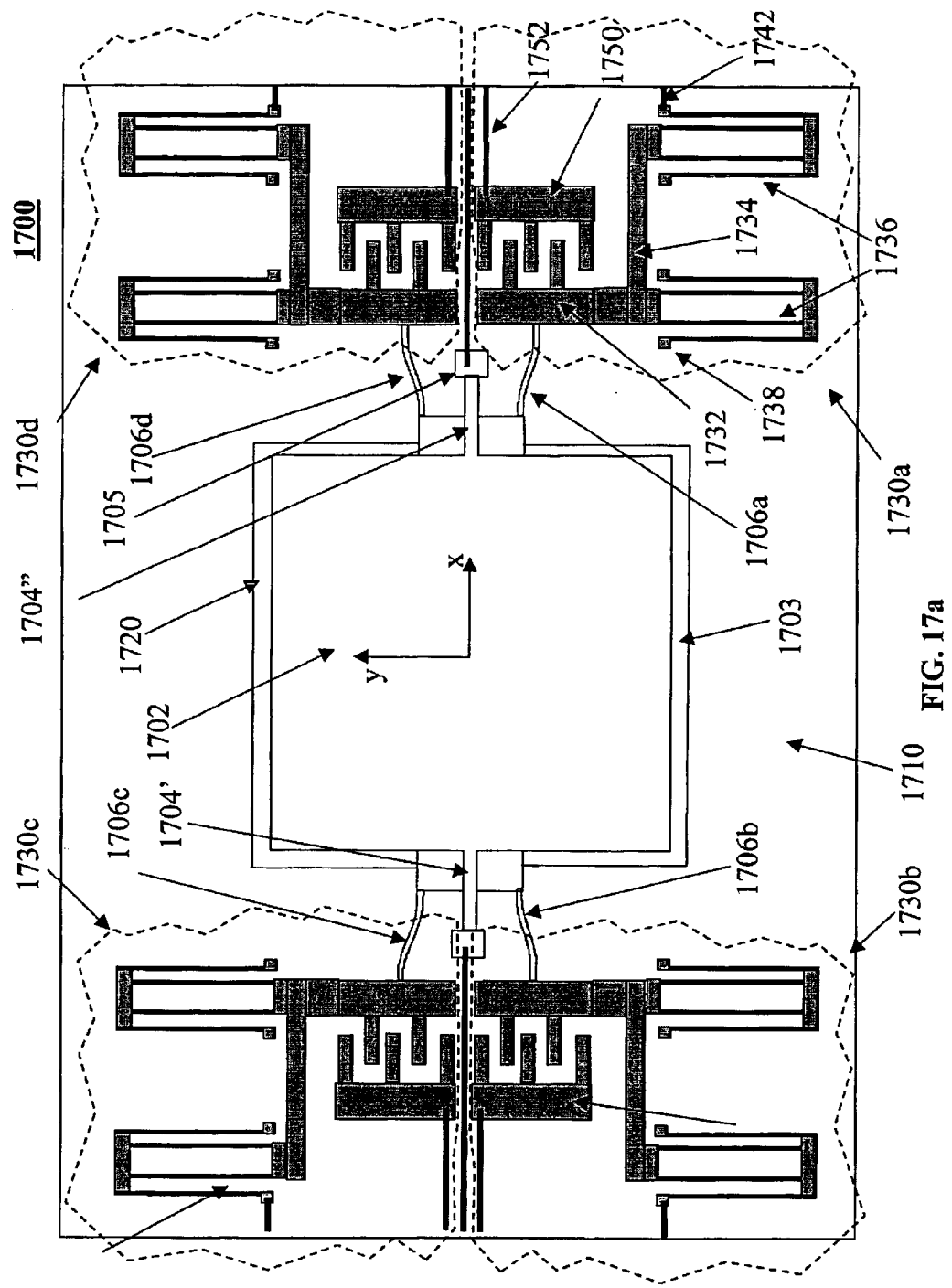
FIG. 17 shows another embodiment of a bouncing mode mirror with in-plane pre-curved nonlinear stiffness elements: (a) top view of the device, (b) top view of the central section with mirror, and (c) isometric view of the mirror section.
Figure 17B:
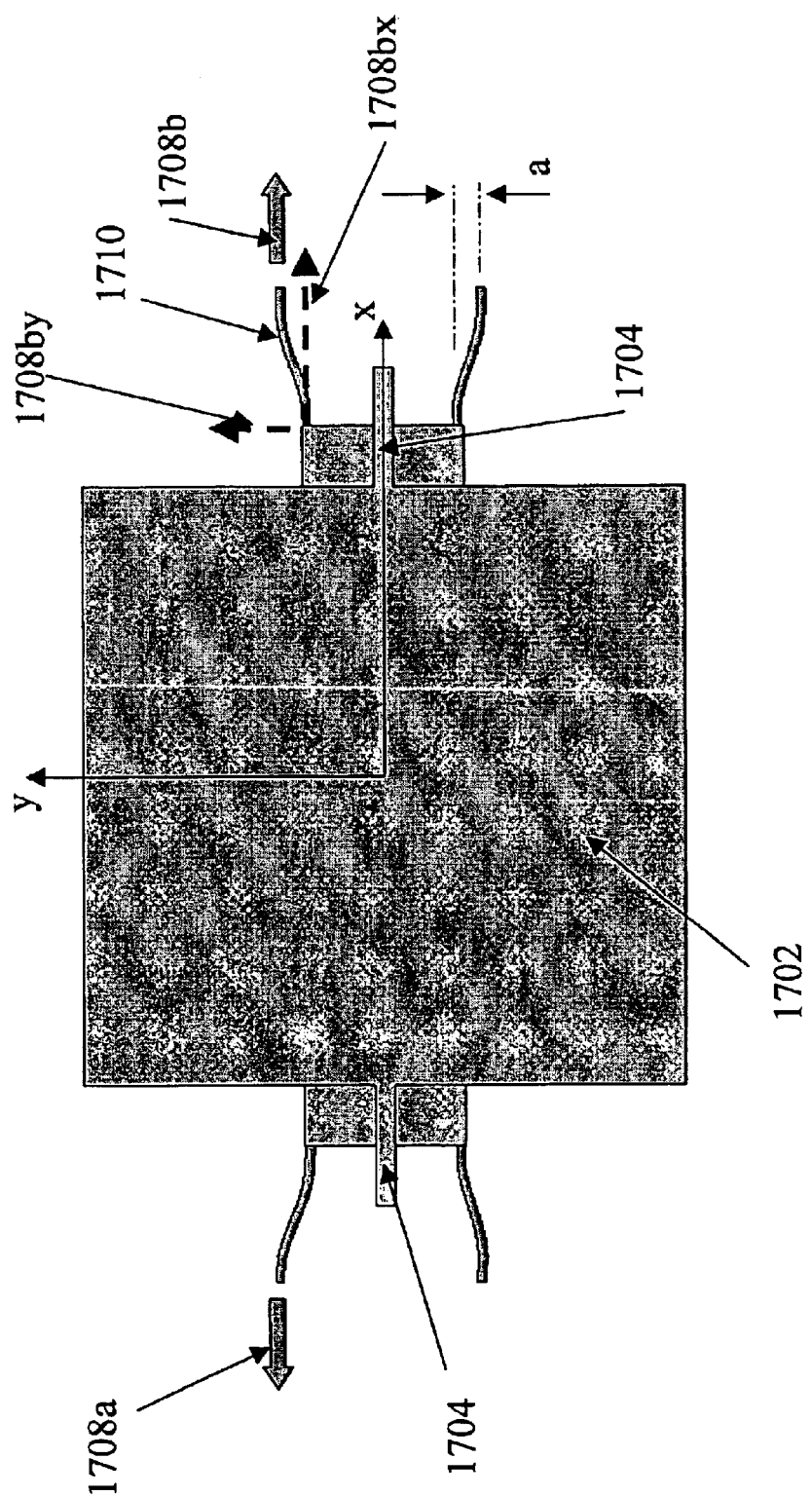
Figure 17C:
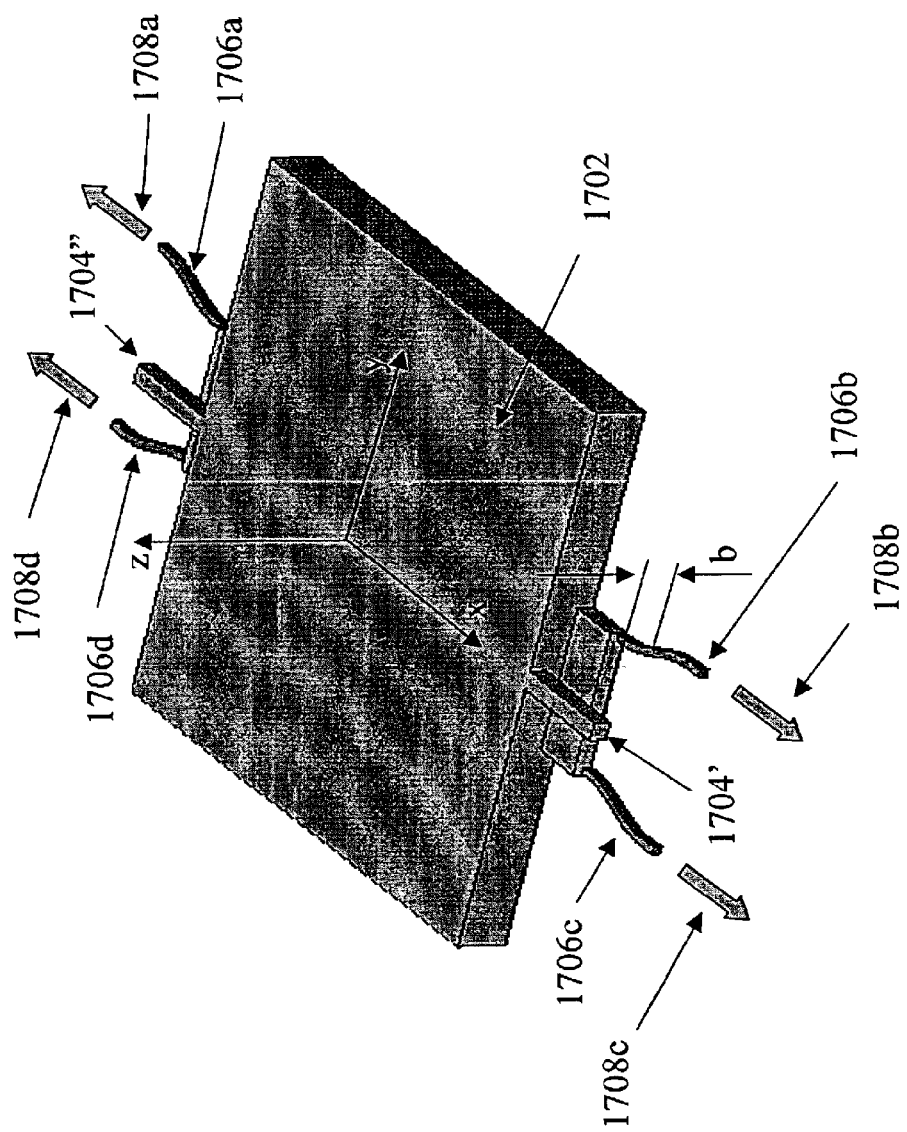

FIG. 17 shows another embodiment of a planar comb driven bouncing mode mirror device 1700 with in-plane pre-curved nonlinear stiffness elements. FIG. 17a shows the entire device, FIG. 17b shows a vector force in the Y direction arising from a pulling force in the X direction. FIG. 17c shows that as a rotation moment around the torsion axis results from the force developed due to the geometry as explained in (b) in combination with the eccentricity b of this force relative to the torsion axis. Device 1700 comprises a mirror 1702 situated in an XY plane and connected by two torsion bars 1704' and 1704" aligned along a common torsion axis in the X direction to a substrate 1710. The mirror is pulled by drivers 1730a and 1730b to the X (and −X) direction either through a pair of curved beams 1706a and 1706b (by forces 1708a and 1708b respectively) or by drivers 1730c and 1730d through a pair 1706c and 1706d curved beams (by forces 1708c, 1708d respectively). When pulled, beams 1706 have a combined action of a nonlinear stiffness element (beam) with a curved-step shape [see 1802b in FIG. 18] with an eccentricity distance 'a'. This eccentricity provides a vertical force vector effect. In addition, the pulling of an opposite pair of curved beams creates a force (e.g. 1708by) in plane XY that is vertical to the pulling force vector (e.g. 1708bx). In other words, the Y direction force vector is eccentric in the Z direction by a distance 'b' to the rotation axis 1704, creating a torsional moment around the rotation axis.

A driver (e.g. 1730a) includes a rotor 1732 pulled by a stator 1750. The rotor has a X-direction degree of freedom as it is fixed to a carrier beam 1734. The carrier beam is connected to two four-beam flexures 1736 anchored to substrate 1710 at pads 1738. The rotor and stator are charged by conductors 1742 and 1752 respectively.

Figure 18:
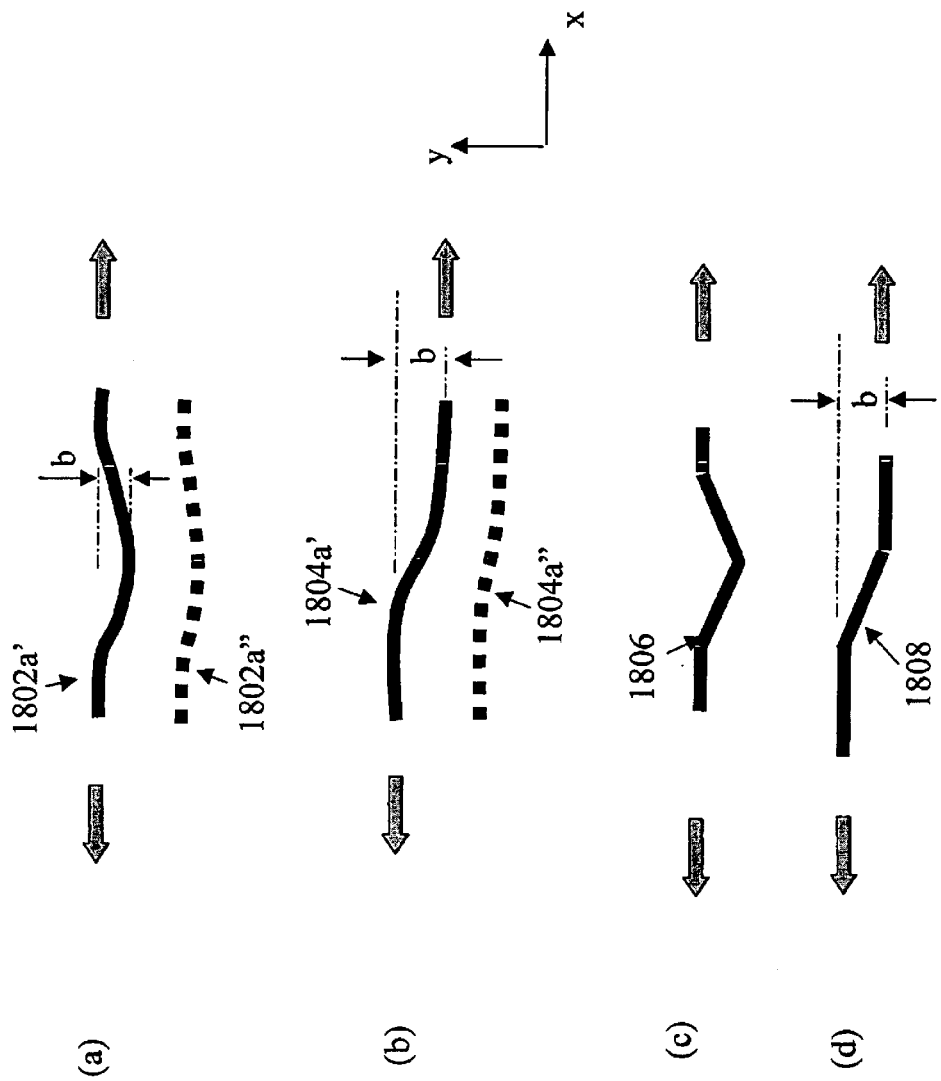
FIG. 18 shows various shapes of pre-curved nonlinear stiffness beams.

FIG. 18 shows various shapes of nonlinear stiffness beams that may be used in the embodiments of FIGS. 15, 16, and 17. These include (but are not limited to) a C-shaped beam 1802 shown in (a), an S-shaped beam 1804 shown in (b), a V-shaped beam 1806 shown in (c) and a Z-shaped beams 1808 shown in (d). In each such beam, the application of a force (shown by arrows) changes the beam curvature and shape, from a state a' to a state b' (shown for simplicity only for the C and S-shaped curves as 1802a', a" and 1804a', a").

Figure 19A:
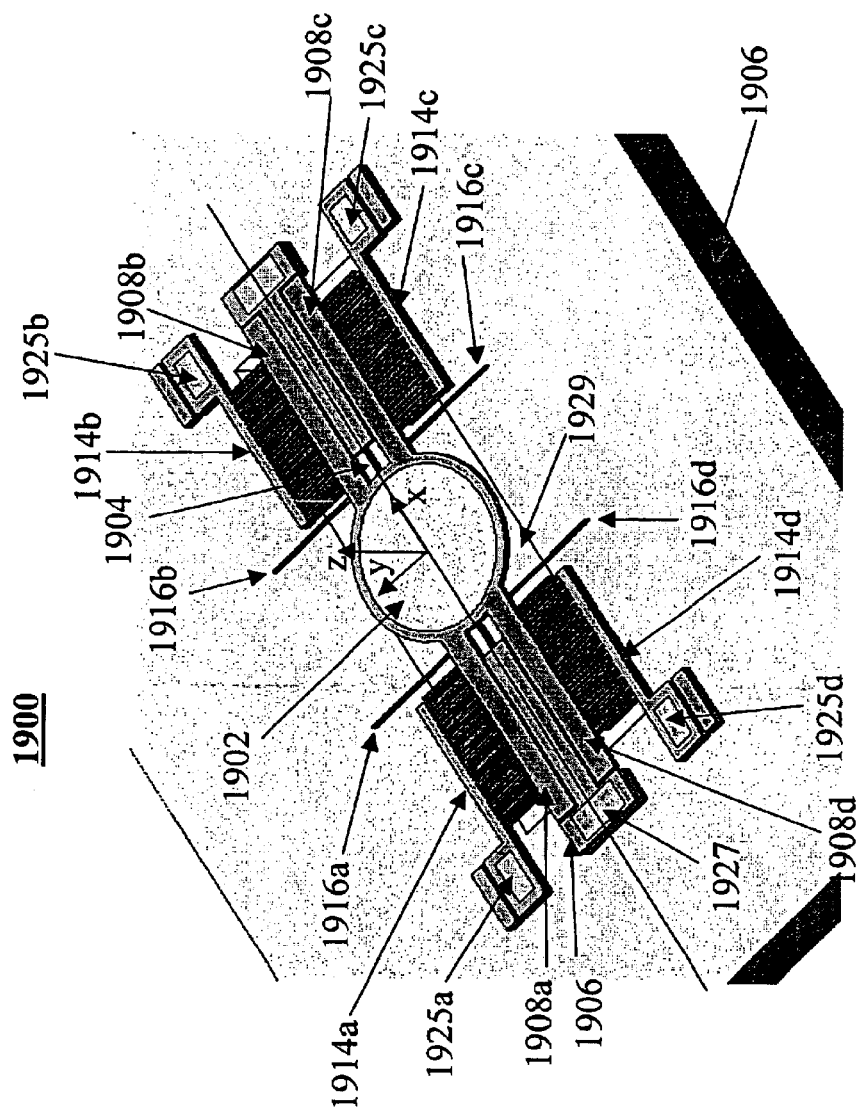
FIG. 19 shows a detailed embodiment of a vertical comb drive actuated bouncing mode micro-mirror with bouncers: (a) general view, (b) enlargement.
Figure 19B:
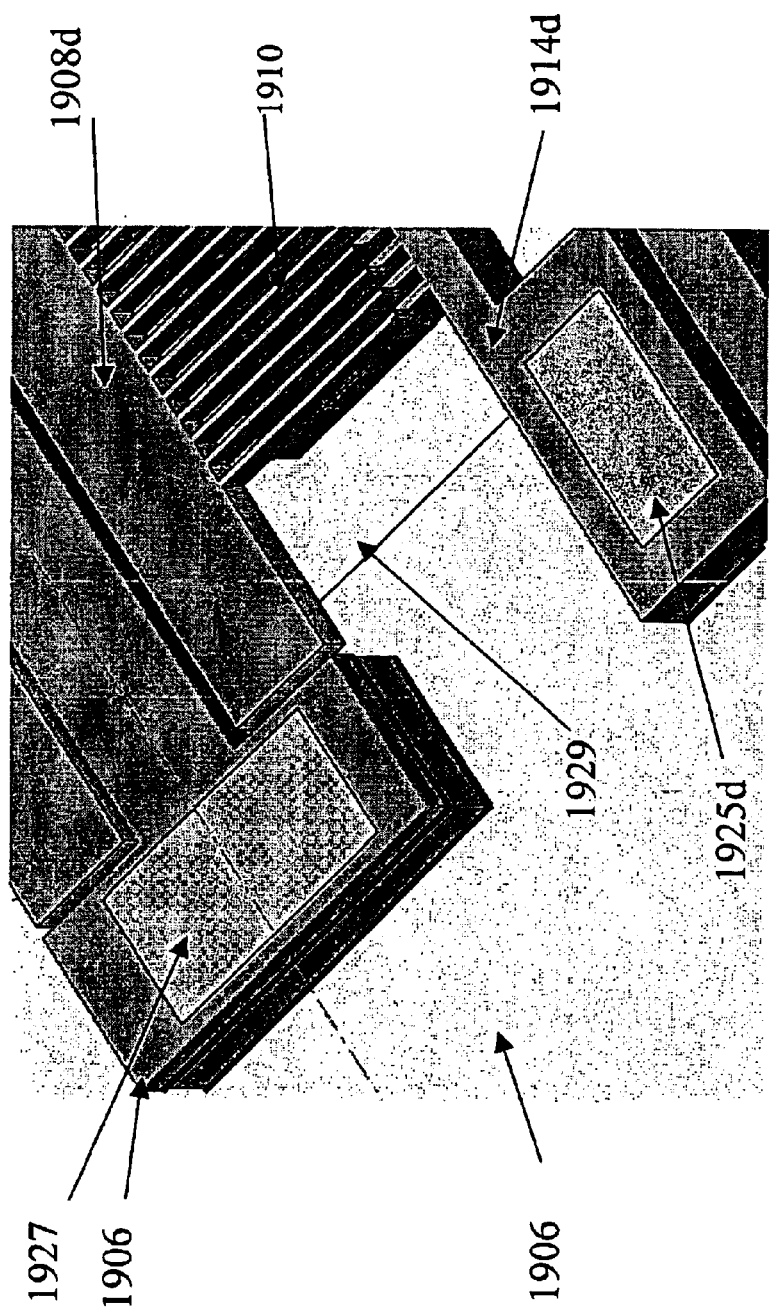

FIG. 19 shows an embodiment of a vertical comb drive actuated bouncing mode micro-mirror device 1900. FIG. 19a shows an isomeric view, while FIG. 19b shows some details of that view. Device 1900 comprises a mirror 1902 connected through torsion springs (axis) 1904 to a layer 1906 in which the mirror is fabricated. The mirror has four arms 1908a–d, which together with respective teeth 1910 form comb drive rotors. The device further comprises stator comb drives 1914a–d. For simplicity only set d is shown in FIG. 19b. In use, the activation of comb drive rotors 1908a and 1908b through conductive pads 1925a and 1925b on respective stators 1914a and 1914b causes rotation of the mirror around torsion axes 1904. To reverse direction, comb drive rotors 1908c and 1908d are activated by conductive pads 1925c, 1925d on stators 1914c and 1914d. The rotors themselves are charged through a conductive pad 1927. Device 1900 further comprises at least one pair of bouncing spring beams 1916a, b that are connected each to a respective rotor arm 1908a, b (and through it to the mirror). Additional pairs of bouncing springs (e.g. 1916c, d) may be connected to rotor arms 1908c, d. When the mirror is rotated around torsion axis 1904, beams 1916 contact stoppers (not shown, but located for example on the handle layer) at the end of the mirror rotation, causing the bouncing effect. In principle, the operation and bouncing effect in this embodiment are similar to those of the embodiment in FIG. 13. The mirror is situated substantially above a release hole 1929.

Fabrication Process

The micro-mirrors can be manufactured using two SOI wafers bonded or fused together, an SOI wafer bonded or fused to a regular Si wafer, or using a special double-active-layer SOI wafer. An exemplary fabrication process of a bouncing mode tilting micro-mirror using a double-active-layer SOI wafer is shown in FIG. 20.

Inventively, the present invention uses a "double-active-layer" SOI wafer in an accurate fabrication process that does not require wafer bonding. The backside etches are aligned to the initial hard mask etch, as described in FIG. 21. The more accurate the processing steps and the alignment between layer features, the higher the precision functionality of the final devices.

FIG. 20 shows a representation of the initial double-active-layer SOI wafer prior to processing. The figure shows a first active layer 2002, a first sacrificial layer 2004, a second active layer 2006, a second sacrificial layer 2008, a silicon substrate 2010, and a third sacrificial layer 2012. Third sacrificial layer 2012 is used for patterning the areas that will be removed underneath the mirror and actuators. The three semiconductor layers, first active layer 2002, second active layer 2006, and substrate 2010 are electrically isolated from one another by layers of sacrificial material (silicon dioxide). First sacrificial layer 2004 is located between the first and second active layers, and second sacrificial layer 2008 is located between the second active layer and the substrate. Each active layer may have a thickness of a few to a few tens of microns.

FIG. 21 (steps a–y) shows details of a process used for fabricating a bouncing mode electrostatic tilting micro-mirror using the wafer construction shown in FIG. 20. The process begins in (a) with deposition of a blank metal layer 2102. The metal is then patterned in (b) using a photoresist mask 2104 and a wet etch is used in (c) to form a mirror metal 2106 and electrical contact pads 2108 for the electrostatic actuator's rotor fingers. A low-pressure chemical vapor deposition (LPCVD) silicon dioxide layer 2110 is then deposited over the metal on the topside of the wafer, in (d). This oxide layer is used both to protect the metal and to form a hard mask for the silicon active layers. The oxide layer is then patterned and etched in (e). The wafer is flipped over, and a photoresist layer 2112 is patterned on the backside in (f) and aligned to the pattern in (e). The third sacrificial layer is etched with reactive ion etching (RIE) in (g), and the photoresist is stripped and a new layer 2114 of photoresist is deposited and patterned in (h). In (i), the third sacrificial layer is etched for a second time using the previously patterned photoresist. The substrate is then etched with a deep RIE (DRIE) process to a typical depth of 50 microns in (j). FIGS. 21(k) and (l) show respectively the backside photoresist being stripped, and another layer of photoresist 2116 being applied. Resist 2116 is patterned in (m), and the substrate is etched in (n) using DRIE until the second sacrificial layer is reached. The second sacrificial layer is etched with RIE in (o), and the DRIE is completed when both the second and third sacrificial layers are reached. In FIG. 21(q), the wafer is flipped over again and optionally placed on a carrier wafer 2130. Also highlighted are the back etches 2132 formed in step (p, q) that allow for mirror movement. A photoresist layer 2140 is spun on the topside in (r), and shown patterned in (s). The first active layer is then etched with DRIE until the second sacrificial layer is reached in (t). In FIG. 21(u), the second sacrificial layer is etched with RIE. A DRIE etch is then used to etch about halfway, i.e. typically 25 microns, through the second active layer in (v). At this point photoresist layer 2140 is stripped and a DRIE etch is used to etch until the first and second sacrificial layers are reached in respectively maskless places, as shown in (w). In the final step, FIG. 21(x), the carrier wafer is removed from the backside of the wafer, the wafer is diced and the sacrificial layers, along with the deposited LPCVD oxide hard mask, are etched in hydrofluoric acid (HF). At this point the rotor fingers 2142 and bouncer spring 2144, stator fingers 2146, and mirror 2150 can be more clearly seen. As the HF etches the first sacrificial layer, the second active layer sections 2148 that remained underneath the rotor fingers fall away from the device between the stator fingers.

In summary, the invention described above facilitates the formation of a triangular output signal for a scanning mirror and other devices by a single element (bouncer or pre-curved nonlinear stiffness element) having a stiffness non-linearity (in the case of the bouncer a combined nonlinear stiffness with the rest of the system). The dependence of resonant frequency on the signal amplitude (and therefore voltage) permits its tuning in a very large range. In a parallel plate actuated embodiment, the mirror can be very close to an electrode when it contacts the bouncer without exhibiting pull-in, since the stiffness of the bouncer is very high. The proximity of the electrode permits to develop very large forces. The bouncer transfers attractive electrostatic forces to repelling forces, so that the mirror is actually driven by pulses.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A tilting micro-mirror device comprising:
   a. a substrate;
   b. a micro-mirror operative to perform a tilt motion around a tilt axis positioned substantially parallel to said substrate, said tilt motion defined by a tilt range ending in a positive or negative maximum tilt angle; and
   c. at least one pair of additional stiffness elements, each element of said pair positioned on opposite sides of said tilt axis and operative to couple to said micro-mirror when said mirror reaches said positive or negative maximum tilt angle, said coupling providing an essentially piecewise linear mirror motion.

2. The tilting micro-mirror device of claim 1, further comprising an actuator operative to provide said tilt motion.

3. The tilting micro-mirror device of claim 2, wherein said at least one pair of additional stiffness elements are connected to an element selected from the group consisting of said mirror and a torsion beam attached to said mirror.

4. The tilting micro-mirror device of claim 2, wherein said at least one pair of additional stiffness elements are connected to said substrate.

5. The tilting micro-mirror device of claim 2, wherein each of said at least one pair of additional stiffness elements are selected from the group consisting of a cantilever, a strip and a beam.

6. The tilting micro-mirror device of claim 2, wherein each element of said at least one pair of additional stiffness elements includes two or more additional elements with different stiffnesses.

7. The tilting micro-mirror device of claim 2, wherein said actuator is selected from the group consisting of a parallel plate electrostatic actuator, a planar comb drive actuator and a vertical comb drive actuator.

8. The tilting micro-mirror device of claim 1, wherein said substrate includes a silicon on insulator (SOI) substrate having an active layer, and wherein said mirror is fabricated in said active layer.

9. The tilting micro-mirror device of claim 8, wherein said SOI substrate includes an SOI substrate bonded to a regular silicon substrate.

10. The tilting micro-mirror device of claim 9, wherein said SOI substrate includes a double-active-layer SOI substrate.

11. A tilting micro-mirror device comprising:
   a. a substrate;
   b. a micro-mirror operative to perform a tilt motion around a tilt axis positioned substantially parallel to said substrate, said tilt motion defined by a tilt range ending in a positive or negative maximum tilt angle; and
   c. at least one pair of pre-curved nonlinear stiffness elements having each two ends, each of said pre-curved elements connected at one of its ends to said micro-mirror and at the other of its ends to said substrate, whereby each said pair is operative to impart said tilt motion an essentially piecewise linear motion characteristic.

12. The tilting micro-mirror device of claim 11, further comprising an actuator operative to provide said tilt motion.

13. The tilting micro-mirror device of claim 12, wherein each element of a said at least one pair of pre-curved nonlinear stiffness elements is selected from the group consisting of a beam and a strip.

14. The tilting micro-mirror device of claim 12, wherein said actuator is selected from the group consisting of a planar comb drive actuator and a vertical comb drive actuator.

15. The tilting micro-mirror device of claim 12, wherein said substrate includes a silicon on insulator (SOI) substrate having an active layer, and wherein said mirror is fabricated in said active layer.

16. The tilting micro-mirror device of claim 15, wherein said SOI substrate includes an SOI substrate bonded to a regular silicon substrate.

17. The tilting micro-mirror device of claim 15, wherein said SOI substrate includes a double-active-layer SOI substrate.

18. The tilting micro-mirror device of claim 11, wherein each said at least one pair of pre-curved elements is selected from the group consisting of a pair of S-shape elements, a pair of C-shape elements, a pair of V-shape elements and a pair of Z-shape elements.

19. A MEMS apparatus for scanning an optical beam comprising:
   a. a mirror operative to perform a rotational motion to a maximum rotation angle around a mirror rotation axis; and
   b. a bouncing mechanism operative to provide a bouncing event and to reverse said rotational motion;
   whereby said bouncing event provides said mirror with a piecewise linear response to actuation by intrinsically nonlinear forces.

20. The MEMS apparatus for scanning an optical beam of claim 19, further comprising an actuator operative to provide said actuation, said actuator connected to a substrate.

21. The MEMS apparatus for scanning an optical beam of claim 19, wherein said bouncing mechanism includes at least one pair of additional stiffness elements, located on opposite sides of said rotation axis, each said nonlinear stiffness element operative to provide one said bouncing event.

22. The MEMS apparatus for scanning an optical beam of claim 21, wherein said at least one pair of additional stiffness elements is connected to an element selected from the group consisting of said mirror and a torsion beam attached to said mirror.

23. The MEMS apparatus for scanning an optical beam of claim 20, further comprising a substrate, wherein said at least one pair of additional stiffness elements is connected to said substrate.

24. The MEMS apparatus for scanning an optical beam of claim 21, wherein each of said additional stiffness elements is selected form the group consisting of a cantilever, a spring and a beam.

25. The MEMS apparatus for scanning an optical beam of claim 20, wherein said bouncing mechanism includes at least one pair of pre-curved nonlinear stiffness elements, each said pre-curved element having two ends, each said pre-curved element connected at one said end to said mirror and an another said end to said actuator.

26. The MEMS apparatus for scanning an optical beam of claim 20, wherein said actuator is selected from the group consisting of a planar comb drive actuator and a vertical comb drive actuator.

27. The MEMS apparatus for scanning an optical beam of claim 25, wherein each said at least one pair of pre-curved elements is selected from the group consisting of a pair of S-shape elements, a pair of C-shape elements, a pair of V-shape elements and a pair of Z-shape elements.

28. The MEMS apparatus for scanning an optical beam of claim 20, wherein said substrate includes a silicon on insulator (SOI) substrate having an active layer, and wherein said mirror is fabricated in said active layer.

29. The MEMS apparatus for scanning an optical beam of claim 28, wherein said SOI substrate includes a double-active-layer SOI substrate.

30. The MEMS apparatus for scanning an optical beam of claim 28, wherein said SOI substrate includes an SOI substrate bonded to a regular Si substrate.

31. A method for scanning an optical beam using a MEMS mirror comprising the steps of:
   a. providing a mirror operative to perform a rotational motion to a maximum rotation angle around a mirror rotation axis; and
   b. providing a bouncing mechanism operative to facilitate a bouncing event and to reverse said rotational motion;
   whereby said bouncing event provides said mirror with a piecewise linear response to actuation by intrinsically nonlinear forces.

32. The method of claim 31, further comprising the steps of
   c. providing a substrate in which said mirror is fabricated in; and
   d. providing an actuator operative to actuate said mirror to achieve said rotation.

33. The method of claim 32, wherein said step of providing a bouncing mechanism includes providing at least one pair of additional stiffness elements, located on opposite sides of said rotation axis, each said additional stiffness element operative to provide one said bouncing event when said mirror reaches said maximum rotation angle.

34. The method of claim 33, wherein said providing of at least one pair of additional stiffness elements includes providing at least one pair of bouncers connected to said mirror.

35. The method of claim 33, wherein said providing of at least one pair of additional stiffness elements includes providing at least one pair of bouncers connected to said substrate.

36. The method of claim 33, wherein said providing at least one pair of additional stiffness elements includes providing at least one pair of elements selected from the group of a cantilever, a spring and a beam.

37. The method of claim 32, wherein said step of providing an actuator includes providing an actuator selected from the group consisting of a parallel plate electrostatic actuator, a planar comb drive actuator and a vertical comb drive actuator.

38. The method of claim 32, wherein said step of providing a bouncing mechanism includes providing at least one pair of nonlinear stiffness elements at least one pair of pre-curved nonlinear stiffness elements having each two ends, each of said pre-curved elements connected at one of its ends to said mirror and at the other of its ends to said substrate.

39. The method of claim 38, wherein said step of providing at least one pair of pre-curved nonlinear stiffness elements includes providing at least one pair of pre-curved elements is selected from the group consisting of a pair of S-shape elements, a pair of C-shape elements, a pair of V-shape elements and a pair of Z-shape elements.

40. The method of claim 32, wherein said step of providing a substrate in which said mirror is fabricated in includes providing a silicon on insulator (SOI) substrate having an active layer.

41. The method of claim 32, wherein said step of providing an SOI substrate having an active layer includes providing a double-active-layer SOI substrate.

42. The method of claim 32, wherein said step of providing an SOI substrate having an active layer includes providing an SOI substrate bonded to a regular silicon substrate.

* * * * *